United States Patent
Miller et al.

(10) Patent No.: US 9,540,863 B2
(45) Date of Patent: Jan. 10, 2017

(54) MULTI-PANE GLASS UNIT HAVING SEAL WITH ADHESIVE AND GAS-RESTRICTIVE COATING LAYER

(71) Applicant: EVERSEALED WINDOWS, INC., Evergreen, CO (US)

(72) Inventors: Seth A. Miller, Englewood, CO (US); David H. Stark, Evergreen, CO (US); William H. Francis, IV, Boulder, CO (US); Viswanadham Puligandla, Flower Mound, TX (US); Edward N. Boulos, Troy, MI (US); John Pernicka, Fort Lauderdale, FL (US)

(73) Assignee: EverSealed Windows, Inc., Evergreen, CO (US)

( * ) Notice: Subject to any disclaimer, the term of this patent is extended or adjusted under 35 U.S.C. 154(b) by 0 days.

(21) Appl. No.: 14/618,887

(22) Filed: Feb. 10, 2015

(65) Prior Publication Data

US 2015/0218876 A1    Aug. 6, 2015

Related U.S. Application Data

(63) Continuation of application No. 13/152,201, filed on Jun. 2, 2011, now Pat. No. 8,950,162.
(Continued)

(51) Int. Cl.
*E04C 2/34* (2006.01)
*E06B 3/663* (2006.01)
(Continued)

(52) U.S. Cl.
CPC ............... *E06B 3/6612* (2013.01); *B32B 7/12* (2013.01); *B32B 17/06* (2013.01);
(Continued)

(58) Field of Classification Search
CPC .. E06B 3/66352; E06B 3/66342; E06B 3/677; E06B 3/6775; E06B 3/6733; E06B 2003/6638; E06B 3/663; E06B 3/66304; E06B 3/66309; E06B 3/66314; E06B 3/66319; E06B 3/66323; E06B 3/6612
See application file for complete search history.

(56) References Cited

U.S. PATENT DOCUMENTS 2,057,452 A  10/1936  Howard
2,122,453 A   7/1938  Clause
(Continued)

FOREIGN PATENT DOCUMENTS

EP  0240584 A   10/1987
EP  0983974 A1   3/2000
(Continued)

OTHER PUBLICATIONS

"Diffusion Bonding—Ceramics and ceramic/meal joints", TWI Knowledge Summary, 2000. http://www.twi.co.uk/content/ksjaf005.html.
(Continued)

*Primary Examiner* — Elizabeth A Quast
(74) *Attorney, Agent, or Firm* — Howison & Arnott, LLP

(57) ABSTRACT

An insulated glass unit (IGU) comprises a first pane of a transparent material and a second pane of a transparent material. The second pane is spaced apart from the first pane to define a cavity therebetween. At least one of a spacer and an array of stand-off members is disposed between the first and second panes to maintain separation therebetween. A first adhesive layer forms at least a portion of a gas-tight connection between the first pane and the second pane. A highly gas-restrictive coating is disposed over the adhesive layer, where the coating is an inorganic layer.

17 Claims, 26 Drawing Sheets

Related U.S. Application Data

(60) Provisional application No. 61/350,866, filed on Jun. 2, 2010, provisional application No. 61/422,268, filed on Dec. 13, 2010.

(51) Int. Cl.

| | | |
|---|---|---|
| *E06B 3/66* | (2006.01) | |
| *B32B 7/12* | (2006.01) | |
| *B32B 17/06* | (2006.01) | |
| *B32B 37/00* | (2006.01) | |
| *B32B 37/12* | (2006.01) | |
| *B32B 37/18* | (2006.01) | |
| *E06B 3/02* | (2006.01) | |
| *E06B 3/56* | (2006.01) | |
| *E06B 3/64* | (2006.01) | |
| *E06B 3/673* | (2006.01) | |
| *E06B 3/677* | (2006.01) | |

(52) U.S. Cl.
CPC ...... *B32B 37/0076* (2013.01); *B32B 37/1284* (2013.01); *B32B 37/18* (2013.01); *E06B 3/025* (2013.01); *E06B 3/56* (2013.01); *E06B 3/64* (2013.01); *E06B 3/66342* (2013.01); *E06B 3/673* (2013.01); *E06B 3/6775* (2013.01); *B32B 2255/205* (2013.01); *B32B 2307/304* (2013.01); *B32B 2307/412* (2013.01); *B32B 2551/00* (2013.01); *E06B 2003/6638* (2013.01)

(56) References Cited

U.S. PATENT DOCUMENTS

| | | | |
|---|---|---|---|
| 2,200,694 A | 5/1940 | Gerecke et al. | |
| 2,219,573 A | 10/1940 | Fraenckel | |
| 2,274,999 A | 3/1942 | Allen | |
| 2,279,168 A | 5/1942 | Kalischer et al. | |
| 2,284,151 A | 5/1942 | Kingston | |
| 2,369,146 A | 2/1945 | Kingston | |
| 2,480,453 A | 8/1949 | Gerardus et al. | |
| 2,502,855 A | 4/1950 | Kingston | |
| 2,584,354 A | 2/1952 | Kissinger et al. | |
| 2,670,572 A | 3/1954 | Smith | |
| 2,753,073 A | 7/1956 | Faulkner | |
| 2,933,423 A | 4/1960 | Brookover et al. | |
| 2,968,125 A | 1/1961 | Montgomery et al. | |
| 3,027,607 A | 4/1962 | Lehr et al. | |
| 3,345,218 A | 10/1967 | Brookover et al. | |
| 3,389,522 A | 6/1968 | Hordis | |
| 3,394,512 A | 7/1968 | Lehr et al. | |
| 3,519,496 A | 7/1970 | Finn et al. | |
| 3,526,550 A | 9/1970 | Larson et al. | |
| 3,537,944 A | 11/1970 | Grubb et al. | |
| 3,737,308 A | 6/1973 | Iwai et al. | |
| 3,902,883 A | 9/1975 | Bayer | |
| 4,015,394 A * | 4/1977 | Kessler | E06B 3/6621 52/171.3 |
| 4,069,630 A | 1/1978 | Chess et al. | |
| 4,149,910 A | 4/1979 | Popplewell | |
| 4,468,423 A | 8/1984 | Hall | |
| 4,705,585 A | 11/1987 | Kelly et al. | |
| 4,798,695 A | 1/1989 | Redel | |
| 5,370,913 A | 12/1994 | Lin | |
| 5,443,871 A | 8/1995 | Lafond | |
| 5,491,953 A | 2/1996 | Lafond | |
| 5,525,430 A | 6/1996 | Chahroudi | |
| 5,784,853 A * | 7/1998 | Hood | E04C 2/54 52/786.11 |
| 5,811,926 A | 9/1998 | Novich | |
| 5,834,891 A | 11/1998 | Novich | |
| 6,055,783 A * | 5/2000 | Guhl | C03C 27/06 156/109 |
| 6,171,703 B1 * | 1/2001 | Haluska | C09D 183/04 257/E21.502 |
| 6,340,508 B1 * | 1/2002 | Frommelt | B32B 17/10036 428/34 |
| 6,401,428 B1 * | 6/2002 | Glover | E06B 3/24 52/786.1 |
| 6,541,084 B2 | 4/2003 | Wang | |
| 6,558,494 B1 | 5/2003 | Wang | |
| 6,635,321 B2 | 10/2003 | Wang et al. | |
| 6,637,644 B2 | 10/2003 | Bachli | |
| 6,641,689 B1 | 11/2003 | Aggas | |
| 6,692,600 B2 | 2/2004 | Veerasamy | |
| 6,701,749 B2 | 3/2004 | Wang et al. | |
| 6,789,362 B1 | 9/2004 | Hessabi | |
| 6,793,990 B1 | 9/2004 | Sakaguchi | |
| 6,860,075 B2 | 3/2005 | Bachli | |
| 6,924,974 B2 | 8/2005 | Stark | |
| 6,928,776 B2 | 8/2005 | Hornung | |
| 6,946,171 B1 | 9/2005 | Aggas | |
| 6,962,834 B2 | 11/2005 | Stark | |
| 6,966,208 B1 | 11/2005 | Collins | |
| 6,974,518 B2 | 12/2005 | Hornung | |
| 7,045,181 B2 | 5/2006 | Yoshizawa | |
| 7,081,178 B2 | 7/2006 | Collins | |
| 7,100,343 B2 | 9/2006 | France | |
| 7,114,306 B2 | 10/2006 | Minaai | |
| 7,141,130 B2 | 11/2006 | Minaai | |
| 7,238,546 B2 | 7/2007 | Stark | |
| 7,378,798 B2 | 5/2008 | Coumans et al. | |
| 7,517,712 B2 | 4/2009 | Stark | |
| 7,832,177 B2 | 11/2010 | Stark | |
| 7,989,040 B2 | 8/2011 | Stark | |
| 8,283,023 B2 | 10/2012 | Mott et al. | |
| 2002/0041424 A1 | 4/2002 | Lynam | |
| 2003/0084622 A1 * | 5/2003 | Hornung | E06B 3/24 52/172 |
| 2005/0217319 A1 | 10/2005 | Yoshizawa | |
| 2006/0151089 A1 * | 7/2006 | Kawamori | B29C 47/0021 156/109 |
| 2006/0187608 A1 | 8/2006 | Stark | |
| 2006/0191215 A1 | 8/2006 | Stark | |
| 2009/0019815 A1 | 1/2009 | Ensinger | |
| 2009/0304956 A1 | 12/2009 | Probster et al. | |
| 2009/0324858 A1 | 12/2009 | Jaeger | |
| 2010/0068561 A1 | 3/2010 | Rohwer et al. | |
| 2010/0155749 A1 * | 6/2010 | Chen | C09K 11/025 257/89 |
| 2011/0059275 A1 | 3/2011 | Stark | |
| 2011/0296771 A1 | 12/2011 | Miller et al. | |
| 2011/0296797 A1 | 12/2011 | Stark et al. | |
| 2012/0137608 A1 * | 6/2012 | Plant | E06B 3/66314 52/204.593 |
| 2015/0292258 A1 * | 10/2015 | Pellini | E06B 3/66319 428/34 |

FOREIGN PATENT DOCUMENTS

| | | |
|---|---|---|
| EP | 1544180 A1 | 6/2005 |
| JP | 1998 10-297944 A | 11/1998 |
| JP | 1998 10-330134 A | 12/1998 |
| WO | 2006121954 A | 11/2006 |
| WO | 2008085325 A2 | 7/2008 |
| WO | 2010019484 A2 | 2/2010 |
| WO | 2010083476 A2 | 7/2010 |
| WO | 2013169504 A | 11/2013 |

OTHER PUBLICATIONS

Kazakov, N.F. (ed.); Diffusion Bonding of Materials; 1981; pp. 4-9, 248-257; Pergamon Press; U.S.A.
PCT: International Search Report and Written Opinion of PCT/US2009/053206 (related application); Feb. 17, 2010; 8 pgs.
PCT: International Search Report and Written Opinion of PCT/US2010/021287 (related application); Sep. 3, 2010; 8 pgs.
PCT: International Search Report and Written Opinion of PCT/US2010/021286 (related application); Sep. 16, 2010; 7 pgs.
PCT: International Preliminary Report on Patentability of PCT/US2004/002272 (related application); Mar. 16, 2005; 4 pgs.

(56) References Cited

OTHER PUBLICATIONS

PCT: International Preliminary Examination Report of PCT/US2003/007553 (related application); Apr. 19, 2004; 7 pgs.
PCT: International Preliminary Report on Patentability of PCT/US2005/013237 (related application); Apr. 18, 2007; 9 pgs.
PCT: International Preliminary Report on Patentability of PCT/US2009/053206 (related application); Feb. 24, 2011; 7 pgs.
PCT: International Preliminary Report on Patentability with International Preliminary Examination Report of PCT/US2010/021287 (related application); May 19, 2011; 8 pgs.
PCT: International Search Report and Written Opinion of PCT/US2011/038973 (related application); Mar. 2, 2012; 8 pgs.
PCT: International Preliminary Report on Patentability with International Preliminary Examination Report of PCT/US2006/017595(related application); Aug. 24, 2012; 11 pgs.
PCT: International Search Report and Written Opinion of PCT/US2012/036693 (related application); Jul. 26, 2012; 7 pgs.
PCT: International Preliminary Report on Patentability Chapter I of PCT/US2011/038973 (related application); Dec. 13, 2012; 5 pgs.
Arata et al. Pressure and Field Assisted Bonding of Glass to Aluminum; Transactions of JWRI is published by Welding Research Institute of Osaka University; vol. 13; No. 1; 1984; pp. 35-40.
Carpenter Specialty Alloys: Controlled-Expansion Alloys (Catalog/Brochure); Dec. 1999; pp. 1-24 (esp. 5-8); Carpenter Technology Corporation (Publ.); Wyomissing, PA USA.
Cerjak, H. (ed.); Mathematical Modelling of Weld Phenomena 5; Diffusion Bonding of Glass to Metal in an Electrostatic Field; M. Morsy et al.; pp. 945-959; London IOM Communications, 2001.
Doron Teomim, Avner Badihi, Gil Zilber; "An innovative approach to wafer-level MEMS packaging"; Solid State Technology (Magazine); Jan. 2002; Penwell (Publ.); Nashua, NH USA.
Dunkerton; TWI Knowledge Summary Diffusion Bonding; Copyright 2001; TWI World Centre for Materials Joinging Technology Website; www.twi.co.uk; United Kingdom; 4 pages.
George S. Brady, et al., Materials Handbook, 12th Edition; 1986; pp. 28-29; McGraw-Hill Book Company; New York.
JPL Technology Reporting Office; "Hermetic Wafer Bonding by Use of Microwave Heating"; NASA Tech Brief, vol. 25, No. 5, from JPL New Technology Report NPO-20608 (NASA Contract No. NAS-7-918); May 1, 2001; Jet Propulsion Laboratory, California Institute of Technology (Publ.); Pasedena, CA, USA; including therein: NTR Inventors Report by Henry W Jackson, John D Mai, Martin B Barmatz, Nasser K Budraa, William T Pike; NASA Case No. 0205 20608; Mar. 1997(?) (Best Available Copy); including therein: (same authors) "Low Pressure and Low Temperature Hermetic Wafer Bonding Using Microwave Heating"; Jet Propulsion Laboratory, California Institute of Technology; Pasedena, CA, USA (Best Available Copy).

Kazakov et al.; Equipment for Diffusion Welding of Rectangular Glass Plates to Kovar; Svarochnoe Proizvodstvo; Jun. 1977; p. 50; (In Russian, English translation provided).
Nicholas, M.G. & Lee, R. J.; Joining Dissimilar Materials, Metals and Materials, The Journal of the Institute of Metals, vol. 5, No. 6, Jun. 1989; UK.
NTR Inventors Report by Henry W Jackson, John D Mai, Martin B Barmatz, Nasser K Budraa, William T Pike; NASA Case No. 0205 20608; Mar. 1997(?) (Best Available Copy); Including therein: (same authors) "Low Pressure and Low Temperature Hermetic Wafer Bonding Using Microwave Heating"; Jet Propulsion Laboratory, California Institute of Technology; Pasadena, CA, USA (Best Available Copy).
Ostyn, K. & Vinckier, A.; Joining of Different Materials Through Interfaces; Interfaces in Materials, Proceedings of the Colloquium; pp. 153-173; Brussels, Dec. 1988.
PCT: International Search Report of PCT/US03/07553 (related application); International Publication No. WO 03/083938 A1; Jun. 16, 2003; 2 pgs.
PCT: International Search Report of PCT/US04/02272 (related application); International Publication No. WO 2004/068189; Jan. 27, 2004; 1 pg.
R.C. Dykhuizen et al.; Gas Dynamic Principles of Cold Spray; Journal of Thermal Spray Technology; vol. 7(2); pp. 205-212; Jun. 1998.
Sadovsky et al.; Precision Welding of Glass to Kovar Without Melting; Svarochnoe Proizvodstvo; Feb. 1973; pp. 22; (In Russian, English translation provided).
PCT: Written Opinion of the International Searching Authority of PCT/US04/02272 (related application); International Publication No. WO 2004/068189; Mar. 16, 2005; 3 pgs.
PCT: International Search Report of PCT/US05/13237 (related application); International Publication No. WO 2005/118291 A3; Oct. 24, 2006; 1 pg.
PCT: Written Opinion of the International Searching Authority of PCT/US05/13237 (related application); International Publication No. WO 2005/118291; Oct. 24, 2006; 5 pgs.
PCT: International Search Report of PCT/US06/17595 (related application); International Publication No. WO 2006/121954; Aug. 20, 2008; 3 pgs.
PCT: Written Opinion of the International Searching Authority of PCT/US06/17595 (related application); International Publication No. WO 2006/121954; Aug. 20, 2008; 10 pgs.
PCT: International Search Report of PCT/US08/76278 (related application); Jan. 16, 2009; 4 pgs.
PCT: Written Opinion of the International Searching Authority of PCT/US08/76278 (related application); Jan. 16, 2009; 5 pgs.
PCT: International Preliminary Report on Patentability of PCT/US2008/076278 (related application); Mar. 25, 2010.

* cited by examiner

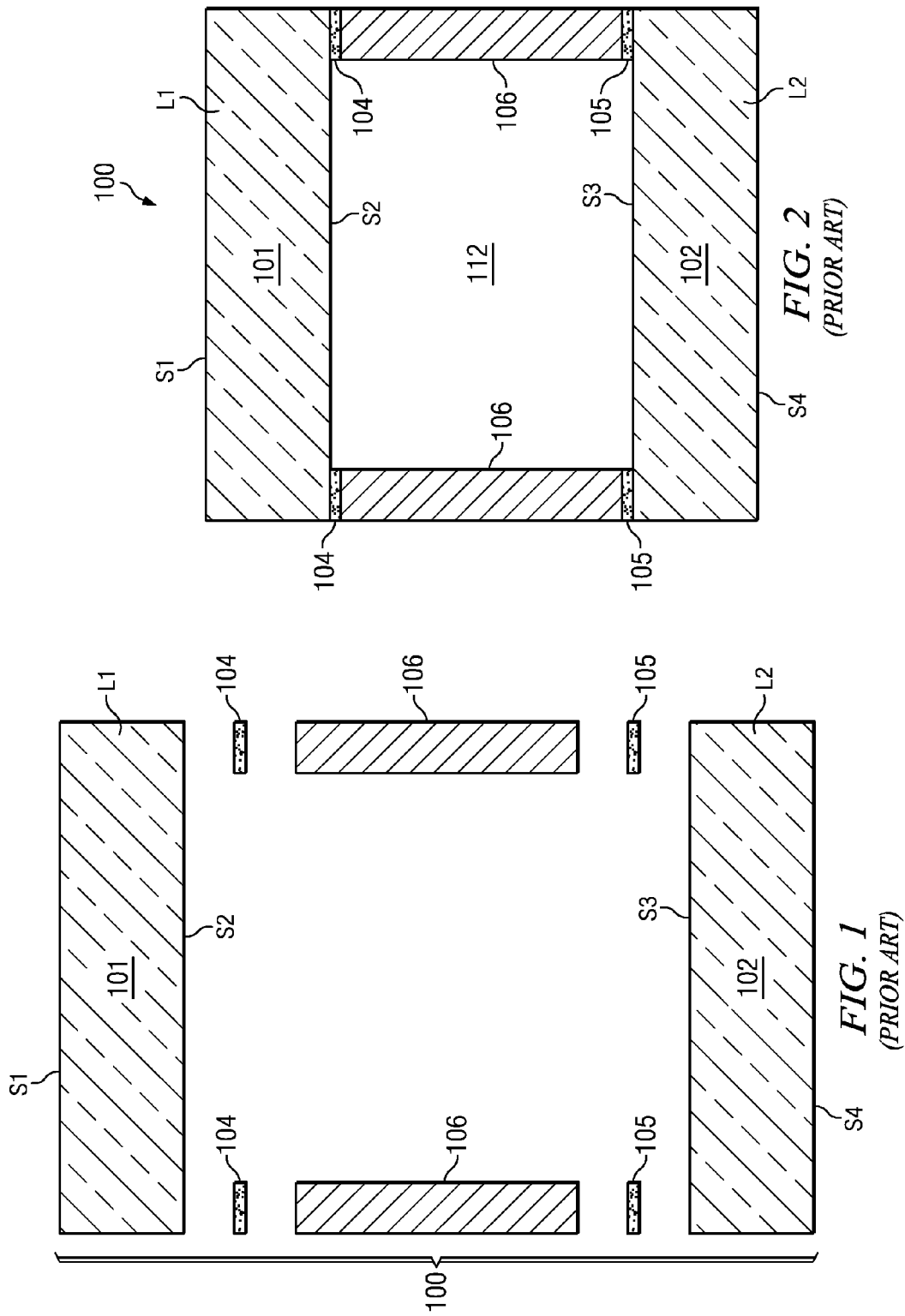

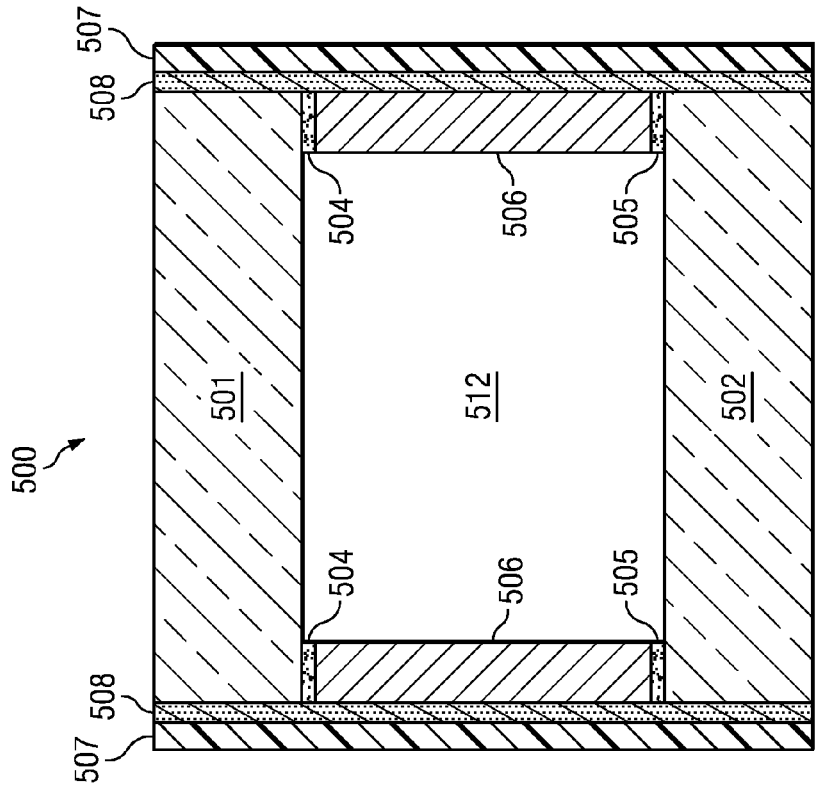
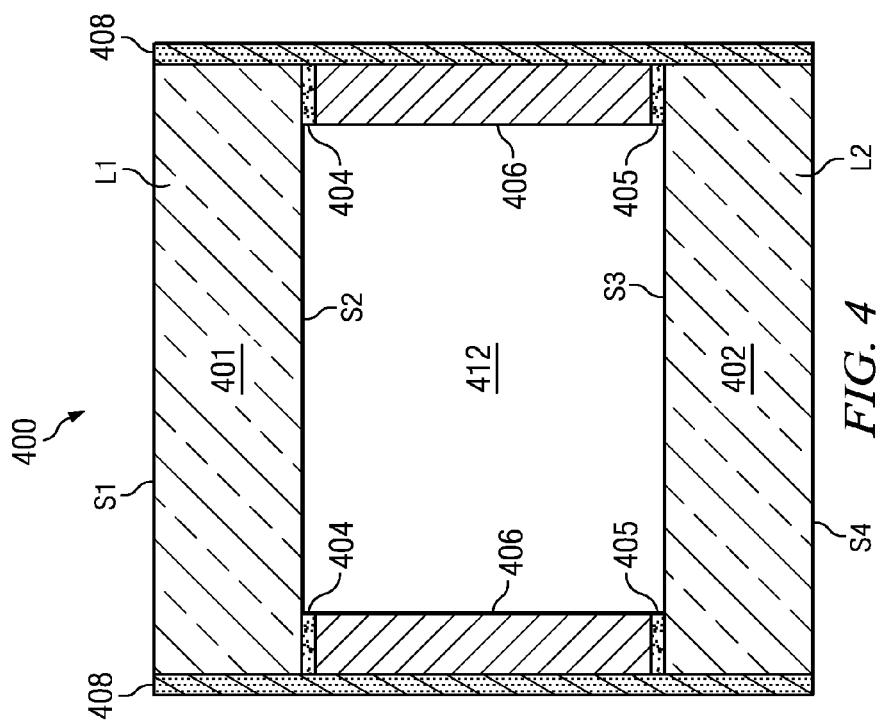

MULTI-PANE GLASS UNIT HAVING SEAL WITH ADHESIVE AND GAS-RESTRICTIVE COATING LAYER

CROSS-REFERENCE TO RELATED APPLICATIONS

This application is a continuation of U.S. patent application Ser. No. 13/152,201, filed on Jun. 2, 2011, entitled MULTI-PANE GLASS UNIT HAVING SEAL WITH ADHESIVE AND HERMETIC COATING LAYER, published as U.S. Patent Application Publication US 2011-0296771 A1, now U.S. Pat. No. 8,950,162, issued on Feb. 10, 2015. U.S. patent application Ser. No. 13/152,201 claims benefit of U.S. Provisional Application No. 61/350,866, filed on Jun. 2, 2010, and entitled TRANSPARENT FILMS, COATINGS AND LAMINATES FOR VACUUM INSULATING GLASS UNITS (VIGUs) AND FOR HIGH-VACUUM INSULATING GLASS UNITS (HVIGUs). U.S. patent application Ser. No. 13/152,201 also claims benefit of U.S. Provisional Application No. 61/422,268, filed on Dec. 13, 2010, and entitled SEAL FOR MULTI-PANE GLASS UNIT HAVING ADHESIVE AND HERMETIC COATING LAYER. U.S. patent application Ser. Nos. 13/152,201, 61/350,866, and 61/422,268, U.S. Patent Application Publication No. US 2011-0296771 A1, and U.S. Pat. No. 8,950,162 are hereby incorporated by reference. In addition, U.S. Pat. No. 7,223,676 is hereby incorporated by reference.

TECHNICAL FIELD

The current disclosure relates to a multi-pane insulating glass unit (IGU) or a multi-pane vacuum insulating glass unit (VIGU) for use in fenestration applications (e.g., windows and doors with windows for buildings); windows for transportation vehicles (e.g., buses, trucks, automobiles, planes, trains, ships); solar collector panels; supermarket refrigeration systems; beverage vending machine glass units; and such other applications where an IGU or VIGU might be used. In particular, the disclosure relates to a multi-pane glass unit having a seal with adhesive and gas-restrictive coating layer(s).

BACKGROUND

Insulating glass units (IGUs) are formed by mating at least two panes of glass to a stand-off system so that at least one cavity is formed between the panes, thereby improving the insulating level relative to a single-pane unit. Vacuum insulated glass units (VIGUs) are a special type of IGU where the cavity/cavities between the panes is evacuated, preferably below a pressure of 1 mtorr (i.e., 1 mtorr=$1\times10^{-3}$ torr).

IGUs of all types use one or more seals to reduce permeability. For insulating glass units (IGUs) that use an internal or external spacer or frame to create the internal cavity, the seals reduce the rate of loss of the fill-gas for gas-filled IGUs and reduce the rate of ingress of ambient air and moisture into the IGU's cavity. For VIGUs, some current sealing technologies use brittle ceramic bonds such as glass frits. These are costly, require high temperature application, and are prone to reliability failures. By contrast, adhesives allow for low-temperature bonding with very high glass-to-metal bond strength, and are extremely inexpensive and also highly reliable. However, the permeability of conventional adhesives is several orders of magnitude too high to maintain the high vacuum requirements of VIGUs. A need exists therefore exists, for a multi-pane glass unit with reliable seals of reduced permeability.

VIGUs are further challenged in that some glazing materials that are conventionally seen as hermetic, for example, some compositions of silica glass, are still sufficiently permeable to gases such as helium that the VIGU's internal cavity pressure can rise above $1\times10^{-3}$ torr over the desired service life of the unit. Other materials, such as metals, can outgas hydrogen at a significant rate, and thereby degrade the quality of the vacuum in the VIGU over its desired service life. A need therefore exists, for a VIGU comprising materials having improved hermeticity, so as to better meet the specifications of the window industry.

SUMMARY

This disclosure describes multi-pane IGUs and/or VIGUs with coatings that significantly decrease the rate of ingress or egress of gases or vapors from the cavity space; and methods for application of such coatings.

In one aspect, a vacuum insulated glass unit (VIGU) comprises a first pane of a transparent material and a second pane of a transparent material. The second pane is spaced apart from the first pane to define a cavity therebetween. At least one of a spacer and an array of stand-off members is disposed between the first and second panes to maintain separation therebetween. A first adhesive layer forms at least a portion of a gas-tight connection between the first pane and the second pane. A highly hermetic coating is disposed over the adhesive layer, where the coating is an inorganic layer.

BRIEF DESCRIPTION OF THE DRAWINGS

For a more complete understanding, reference is now made to the following description taken in conjunction with the accompanying Drawings. Note that the dimensions and thicknesses shown are not to scale.

FIG. 1 is an exploded cross-sectional view of a multi-pane glass unit in accordance with the PRIOR ART, in this case a double-pane IGU;

FIG. 2 is a cross-sectional view of the assembled PRIOR ART IGU of FIG. 1;

FIG. 3b is a perspective cross-sectional view the PRIOR ART IGU of FIG. 3a;

FIG. 4 is a cross-sectional view of a multi-pane glass unit in accordance with one aspect of the invention, in this case a double-pane IGU with a gas-restrictive coating;

FIG. 5a is a cross-sectional view a multi-pane glass unit in accordance with another embodiment, in this case a double-pane IGU with gas-restrictive coating and secondary sealant material which covers the gas-restrictive coating;

FIG. 5b is an exploded perspective cross-sectional view the IGU of FIG. 5a;

FIG. 6b is an exploded perspective view of FIG. 6a.

FIG. 10b is an exploded perspective cross sectional view of the IGU of FIG. 10a;

DETAILED DESCRIPTION

Figure 3A:
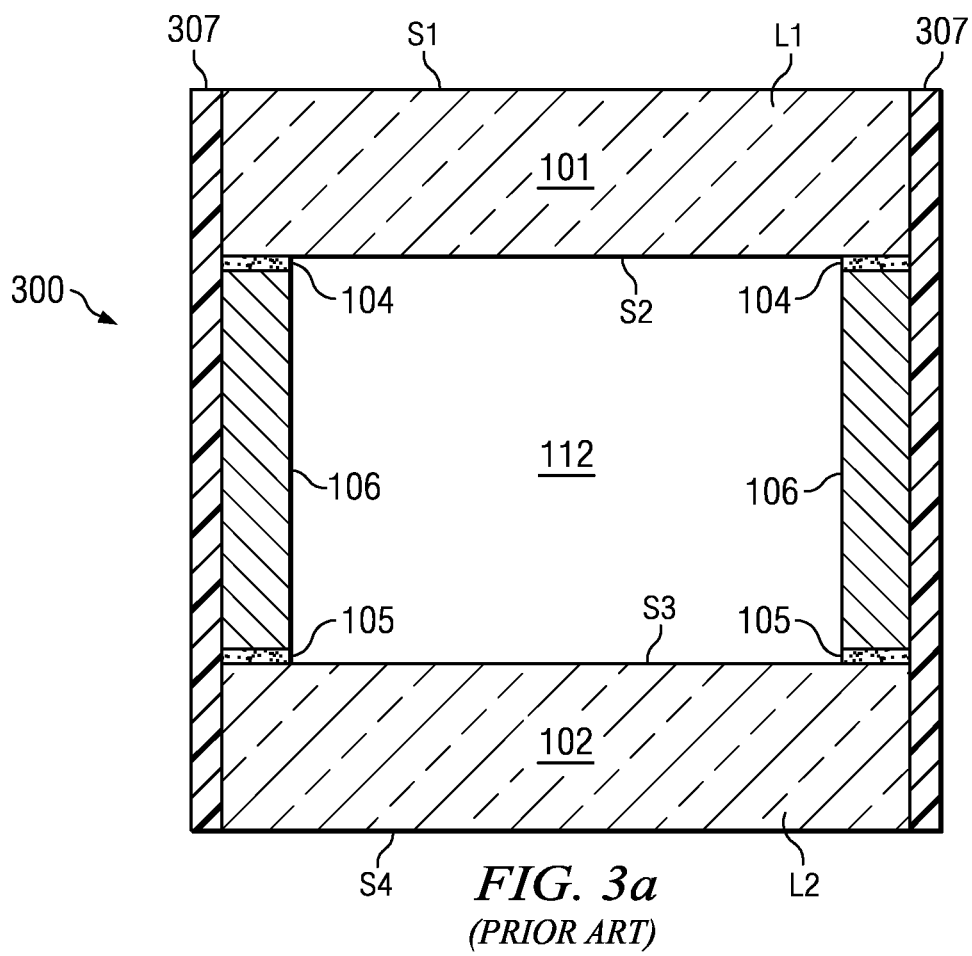
FIG. 3a is a cross-sectional view of another multi-pane glass unit in accordance with the PRIOR ART, in this case a double-pane IGU having a (non-hermetic) secondary sealant applied to the perimeter edges of the IGU.

Multi-pane insulating glass units or insulating glazing units (IGUs) consist of two or more panes of glass (lites) with a spacer between the panes around their perimeter, to create a cavity for air or another gas. The number of glass lites is "N" and the number of contained cavities "C" is N−1. (C equals N minus 1.) The number of spacers "S" is N−1. (S equals N minus 1.) The spacer for a multi-pane IGU (afterwards referred to as simply an IGU) may be held in place with an adhesive or sealant. After assembly of the IGU and the optional filling of the cavity with a fill-gas (e.g. argon, krypton or xenon), a secondary seal may be applied to the perimeter of the glass unit to act as a protective layer against both physical damage to the perimeter of the glass unit, as well as providing additional mechanical strength to the assembly and reducing the ingress of atmospheric gas into the cavity of the unit or egress (escape) of gas from the cavity of the unit.

For convenience, the following nomenclature is used herein for a dual-pane IGU: Lite 1 ("L1") is the outdoor (i.e., outside-facing) lite and lite 2 ("L2") is the indoor (i.e., inside-facing) lite; Surface 1 ("S1") is the exterior (i.e., outside-facing) surface on L1, surface 2 ("S2") is the interior (i.e., cavity-facing) surface on L1, surface 3 ("S3") is the exterior (i.e., cavity-facing) surface on L2 and surface 4 ("S4") is the interior (i.e., inside-facing) surface on L2.

Multi-pane vacuum insulating glass units or vacuum insulating glazing units (VIGUs) are IGUs that have a very low pressure in their cavities so as to be more insulating than an air or gas-filled IGUs. The optimal pressure in a cavity of a VIGU is no more than $1 \times 10^{-3}$ torr, as this is very close to the point of inflection on the thermal conductivity curve for low-pressure gases for window geometries. Because no known adhesive or epoxy is impermeable enough to prevent the ingress of atmospheric gases into the cavity of a VIGU during its life, the two glass panes of a double-pane VIGU are conventionally sealed using inorganic materials. Current sealing methods for VIGUs include the use of solder glass or glass frit between and at the perimeter of the two lites; metal foils/ribbons bonded to each of the lites and then welded together to create a sealed cavity between the lites; and other hermetic sealing methods.

The disclosed multi-pane IGUs may have 2, 3, 4 or more glass panes or lites and 1, 2, 3 or more spacer members to create the cavities between adjacent pairs of lites. In addition, the disclosed IGUs may incorporate non-glass panes or barrier films (or "suspended films") inside the IGU in lieu of one or more internal glass lites. For example, one possible suspended film is "Heat Mirror" brand film marketed by Southwall Technologies, Inc.

In some embodiments, the disclosed VIGUs may be dual-pane systems having a basic configuration similar to, e.g., the "SPACIA" brand VIGU marketed by Nippon Sheet Glass Co., Ltd. or the "Pro-VIG" brand VIGU marketed by a German government-sponsored consortium. In other embodiments, the disclosed VIGUs may be triple pane systems. In still other embodiments, the disclosed VIGUs may be hybrid VIGUs having a basic configuration similar to, e.g., the "SPACIA 21" brand VIGU by Nippon Sheet Glass Co., Ltd. In each case, however, the disclosed embodiments have additional and/or different structures and/or materials that provide improved performance as compared to existing units.

This specification describes multi-pane glass units, whether IGUs or VIGUs, that have one or more surfaces coated in order to reduce the rate of gas permeation into and/or out of the internal cavity/cavities. In some embodiments, the coatings are applied over glass, to reduce the helium permeability through glass. In other embodiments, the coatings are applied over metal, to reduce the rate of out-gassing of hydrogen from the metal into the cavity. In still another example, the units are sealed using traditional adhesives, which adhesives are subsequently treated with a coating to reduce their permeability. For IGUs, one goal of such a treatment is to reduce the leak rate of the fill-gas (e.g., argon gas) through the adhesive seal, in order to prolong the lifetime of the sealed unit. For VIGUs, one goal of such a treatment is to convert a non-hermetic, adhesive seal into a hermetic one capable of retaining and maintaining a vacuum in the VIGU cavity over the desired life of the window. Means for achieving these improved seals are described herein.

As used herein, the term "adhesive" shall refer to any non-hermetic bonding material, whether a silicone, epoxy, urethane, or any organic sealant.

The present invention disclosed herein comprises, in one aspect thereof, a method for manufacturing an IGU in accordance with traditional methods, but further incorporating one or more additional step(s) in the manufacturing process to add a layer of a gas-restricting coating onto the IGU after it is assembled with at least the primary sealant or adhesive. This coating is done before applying any secondary sealant member.

This gas-restricting coating layer will significantly reduce the ingress and egress of gases and vapors between the internal cavity of the IGU and the atmosphere outside of, or surrounding the IGU. This will result in improved IGUs that maintain their insulation properties longer because: 1) if the IGUs are filled with a fill-gas (e.g., argon, krypton or xenon), the improved IGUs will contain the fill-gas at or near the original percentage of fill (i.e., performed in manufacturing) for a much longer period of time; 2) the gas-restricting coating will reduce moisture penetration or permeation into the cavity of an improved IGU, where such moisture might: a) be visible as a film or condensation on the internal surfaces of the glass lites, b) be detrimental to coatings applied to the internal lite surfaces (e.g., coatings to increase the thermal performance of the IGU), c) increase the corrosion propensity of the metallic members of the unit. These same issues apply to IGUs with more than 2 panes of glass (e.g. triple- and quad-pane IGUs, as well as suspended-film IGUs).

The present invention disclosed herein comprises, in another embodiment thereof, a method for manufacturing an IGU in accordance with traditional methods, but further adding at least one step in the manufacturing process to add a layer of a gas-restricting coating onto the IGU after it is assembled with the primary sealant or adhesive but without applying the secondary sealant member.

The present invention disclosed herein comprises, in still another aspect thereof, a method for manufacturing a multi-pane IGU in accordance with traditional methods, but further adding at least one step in the manufacturing process to add a layer of a gas-restricting coating onto the IGU after it is assembled with the primary sealant or adhesive and also a secondary sealant member. In this embodiment, the gas-restricting layer may be applied on top of the exposed surfaces of a secondary sealant member. The secondary sealant member may have three exposed surfaces: 1) the surface in-plane with the IGU's surface S1; 2) the surface perpendicular to the plane of the glass, running from lite L1 to lite L2; and 3) the surface in-plane with the IGU's surface S4.

One or more (exterior) surfaces of the two outside-facing glass lites of an IGU may be coated with the same gas-restricting coating used to cover the adhesive or epoxy material during the coating application process. The choice of whether or not a particular embodiment of the process coats one or both exterior glass surfaces, or uses a mask to selectively prevent coating them, or directs the application of the coating only onto the desired surfaces of the adhesive or epoxy and other parts of the perimeter of the IGU, depends on the beneficial or non-beneficial (undesirable) attributes of the selected gas-restricting coating. These attributes include the coating's physical, optical and chemical properties. This decision on whether to coat the two exterior-facing glass surfaces applies to dual-pane IGUs as well as to IGUs with more than two panes of glass (e.g., known in the window industry as triples or quads), and also to suspended-film IGUs incorporating one or more suspended film layers and other variations of IGUs.

The present invention disclosed herein comprises, in another aspect thereof, a method of coating the inside of an IGU through the fill-tubes of the IGU. In this method, precursor gases are supplied to the inside of the IGU via the fill tubes, and the precursor gases react inside the IGU to form a gas-restricting coating on the inside of the IGU adhesive. In some embodiments, the IGU adhesive that is coated is a polyisobutylene (PIB, or butyl) material. In other embodiments, a different adhesive, for example, a polyurethane material, is used as the primary adhesive, and this adhesive is subsequently coated with the gas-restricting coating. In some other embodiments, the coating process results in the formation of inclusions of coating particles inside the adhesive, and these particles are sufficient to restrict gas flow, such that a uniform, full coating of the gas-restricting coating over the adhesive is not required.

When the interior surfaces of glass lites comprising an IGU/VIGU initially have certain low-emissivity (or "low-e") properties and are subsequently coated with the gas-restrictive coating material, the initial low-e properties of the glass may change, depending on the thickness of the gas-restrictive coating. Thus, in some embodiments, the initial low-e coatings on the glass are selected so that that they require the additional gas-restrictive coating to achieve optimal performance. Put another way, the emissivity of the glass before application of the gas-restrictive coating is higher than the emissivity of the glass after application of the gas-restrictive coating.

The present invention comprises, among other things, multi-pane IGUs manufactured according to any of the above-described methods.

In some embodiments of IGUs, the gas-restricting coating may reduce egress of fill gas from the IGU to <1% of the initial fill-gas volume per year under severe or extreme use conditions. A plurality of embodiments are possible depending on the nature of the inert fill-gas. In some embodiments, the fill gas is argon. In some other embodiments, the fill gas is krypton. In still some other embodiments, the fill gas is sulfur hexafluoride.

The conventional method of manufacturing a dual-pane VIGU uses a solder glass (i.e. a glass frit) that bonds the two lites together at the VIGU's perimeter to form a hermetic seal. However, the permeability of window glass or solder glass may be a problem for certain compositions of glasses. The present invention disclosed herein comprises, in one aspect, a coating applied over and/or into at least some of the glass components of the VIGU that reduces the permeability of the glass to helium. In one aspect, the coating is deposited on the glass from the vapor phase. In another aspect, the coating is deposited on the glass from the solution phase. In yet another aspect, the coating is created by diffusing atoms into a thin region near the surface of the glass, so that the diffusing atoms create a local composition near the surface of the glass which is different form the composition in the bulk of the glass, and where this local composition serves to restrict the diffusion of gases such as helium through the glass. In some applications, the glass to be coated is window glass. In some applications, the glass to be coated is solder glass. In some applications, both window glass and solder glass are coated.

The present invention disclosed herein comprises, in another aspect thereof, a VIGU comprising a metal component, where the metal component includes a coating on at least the cavity-facing side to restrict the outgassing of hydrogen from the metal into the cavity. The coating on the metal component may be applied from the vapor phase by methods including, but not limited to, chemical deposition, physical vapor deposition and atomic layer deposition; or it can also be deposited from the solution phase by methods including, but not limited to, spray coating, solvent casting and dip coating.

The present invention disclosed herein comprises, in another aspect thereof, a VIGU with an adhesive as a component, where the adhesive is coated by a film that impedes gas permeability. In one example, this VIGU is prepared by first applying an adhesive bond between a lite and a second surface, and applying a layer of a highly hermetic material to the perimeter of the VIGUs to cover the outside facing surface of the adhesive or epoxy material (as opposed to the inside or cavity-facing surface of the adhesive or epoxy material). Advantages of this type of VIGU may include: a) the ability to hermetically seal the VIGU at lower process temperatures than those required for using a glass frit seal; b) a stronger and/or more flexible seal as compared to a glass frit seal; c) lower cost as compared to a glass frit seal; and d) faster cycle-time process equipment to produce the hermetic seal as compared to a glass frit seal.

The present invention disclosed herein comprises, in another aspect thereof, a method for manufacturing a hybrid VIGU (e.g., similar to the NSG "SPACIA 21" insulating glass system) of the type that otherwise would use a conventional hermetic sealant such as a solder glass (i.e., a glass frit); except in this aspect an adhesive or epoxy would be substituted for the conventional glass frit, and further the adhesive or epoxy would be subsequently coated with a gas-restricting coating to reduce its permeability to gas. Optionally, in some embodiments an additional material may be applied to physically protect the perimeter edges of the hybrid VIGU where the secondary sealant layer previously would have been used.

The present invention disclosed herein comprises, in another aspect thereof, a VIGU including two thin metal members, one such metal member attached to each of lites L1 and L2 along the VIGU's perimeter, where the metal members are bonded to the glass using an adhesive or epoxy. This aspect also includes a method of bonding the metal to the glass using adhesive, and subsequently joining together the two metal pieces using a metal joining process (e.g., welding) to create a sealed VIGU (not including any temporary gas evacuation port), where the adhesive or epoxy is coated with a highly hermetic material layer after the bonding step. In one embodiment, the adhesive or epoxy used to create the glass-to-metal bonds that will be outside the VIGU's low-pressure (i.e., high-vacuum) cavity remains uncoated so that the adhesive or epoxy bonding material can out-gas or otherwise exchange gases and achieve equilibrium with the atmosphere surrounding the outside of the VIGU. In another embodiment, the adhesive forms a fillet on the outside-facing surface, and in some preferred embodiments this fillet is purposefully abraded to remove the hermetic coating, allowing equilibrium between the adhesive and the environment. In another embodiment, a fillet is left on the outside of the cavity but not on the inside, and the hermetic layer on the fillet will crack on the fillet side but not the cavity side during thermal cycling because of larger stresses on the fillet surface, restoring said equilibrium during normal use. In another embodiment, the VIGU has more than two glass panes, and more than one contained cavity for the low-pressure (i.e., high-vacuum) environment.

The glass lites of a VIGU could be coated with the same highly hermetic coating used to cover the adhesive or epoxy material during the same hermetic coating application process. As described above for an IGU, if desired, these glass surfaces may be selectively masked to prevent coating of some or all of the glass surfaces.

In embodiments where the surfaces of the glass lites are coated with the highly hermetic material, the low-e properties of the glass may change significantly. Thus, in some embodiments, the low-e coatings on the glass are selected such that that they require the highly hermetic coating to achieve optimal performance: e.g., the emissivity of the glass before application of the highly hermetic coating is higher than the emissivity of the glass after application of the highly hermetic coating.

The present invention disclosed herein comprises, in another aspect thereof, a VIGU that is sealed with adhesive, where the VIGU's interior compartment is in fluid communication with the exterior via one or more (temporary) gas access ports. The present invention discloses herein a method for coating the inside of the VIGU with a highly hermetic material using gas phase precursors that access the interior via these gas access ports. In this method, the VIGU is evacuated through these port(s) after the coating process is complete, and the port(s) are sealed shut. Thus, the entire coating process is confined to the interior of the VIGU.

The present invention disclosed herein comprises, in another aspect thereof, a method for manufacturing a VIGU which uses a thin metal seal attached to lites L1 and L2 to create the hermetic seal at the VIGU's perimeter, where the bond between the glass and metal is coated or infused with a chemical or material that restricts gas transport. One or more bonding methods including, but not limited to, ultrasonic solder bonding, diffusion or thermal-compression bonding, chemical bonding with or without mechanical assistance, and glass-fit bonding, may be used to bond the glass to the metal. After the metal members are joined together to create a sealed VIGU, the glass-to-metal bond is coated on its internal and/or external surfaces with a highly hermetic material layer. In the absence of the highly hermetic coating, defects and/or damage (e.g., cracking) that may occur during the manufacturing process or subsequently may allow gas permeation through the seal even though such defects do not mechanically degrade or separate the glass-to-metal bond. The highly hermetic coating applied in accordance with this aspect bridges and strengthens the defects and/or damage to prevent permeation of any gases into the evacuated cavity, and to inhibit further crack growth. In this embodiment, it is possible to coat locally, just the bonded region, although a method which coats the entire assembly is also envisioned.

In some embodiments, a highly hermetic coating is applied over the interior glass of a VIGU that fills microcracks on the glass surface, and thus improves the resistance of the glass to fracturing under stress. In this embodiment, the 1-sigma or 2-sigma or 3-sigma or 4-sigma or 5-sigma or 6-sigma (i.e., where each sigma=one standard deviation from the mean) minimum compressive stress needed to fracture the glass when applied by a 0.2 to 1 mm diameter stainless steel cylinder is improved by the coating process. This coating may be applied at any point during the assembly process, for example, before and/or after the glass is bonded to a metal member, or before and/or after the lites are joined to form an internal cavity. In one example, this coating is aluminum oxide deposited by atomic layer deposition.

In some examples, the gas-restrictive coating material described for the IGU is different from the highly hermetic coating material of the VIGU. In other embodiments, the gas-restrictive coating material for the IGU is the same as the highly hermetic coating material of the VIGU.

Referring now to FIG. 1, there is shown an exploded cross-sectional view of a multi-pane glass unit (in this case a double-pane IGU) in accordance with the PRIOR ART. The IGU 100 comprises a first lite 101 and a second lite 102. A spacer 106 is attached to lites 101 and 102 with an adhesive or epoxy material 104. The adhesive or epoxy material 104 bonds the spacer 106 to the inside surface of lite 101. If lite 101 is configured in the window assembly as the outdoor-facing lite (denoted L1), then the lite's top surface or outdoor-facing surface is referred to by the window industry as surface 1 (denoted S1). The opposite surface, which is attached to spacer 106 by the adhesive or epoxy material 104, is referred to as surface 2 (denoted S2). The spacer 106 is attached to lite 102 (denoted L2) using adhesive or epoxy material 105. In many common uses, the adhesive is butyl, but other materials may also be employed. Hereafter, "adhesive or epoxy material" will be referred to as "adhesive", "an adhesive" or "the adhesive". The surface of lite 102 in contact with adhesive 105 is referred to by window industry as surface 3 (denoted S3). The opposite surface of lite 102, which in this example would be facing the indoor side of a wall, is referred to by the window industry as surface 4 (denoted S4).

Referring now to FIG. 2, there is shown a cross-sectional view the assembled PRIOR ART IGU 100 whose components were defined in the description of FIG. 1. The adhesive 104 is used to attach lite 101 to spacer 106. Spacer 106 is attached to lite 102 using the adhesive material 105. The assembled unit creates a cavity, 112, in between the two lites.

Referring now to FIG. 3a, there is shown a cross-sectional view of an alternative IGU in accordance with the PRIOR ART. IGU 300 is similar to that described in FIGS. 1 and 2, but further comprising a secondary seal (or secondary sealant) 307. This secondary seal 307 is applied to the perimeter edges of the IGU 300 to provide physical protection, to act as a barrier to reduce the rate of ingress of outside air and moisture into the IGU's cavity 112 and/or to reduce the rate of egress (rate of escape) of any fill-gas inserted into the cavity 112 as part of the IGU's assembly process.

Figure 3B:
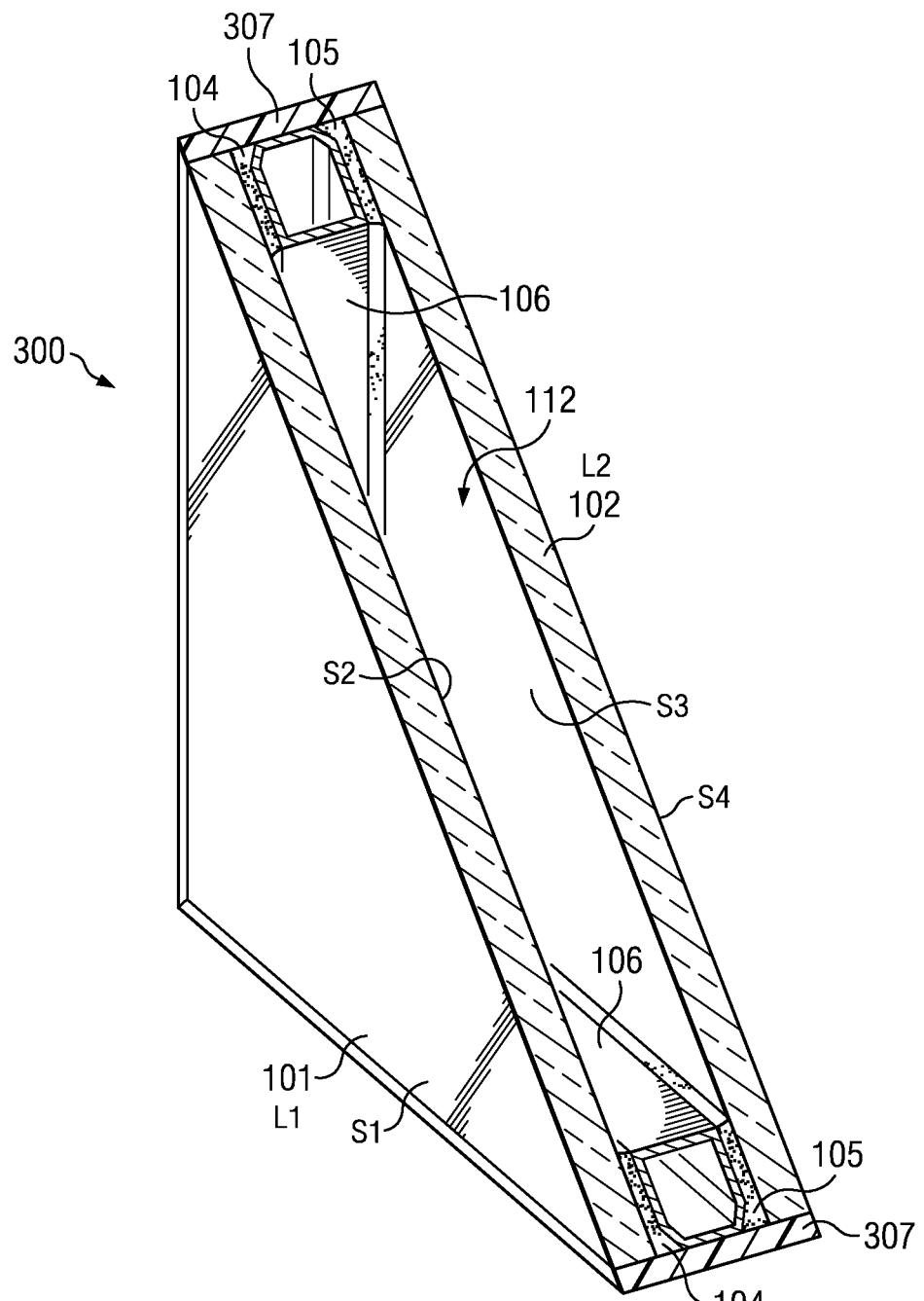

Referring now to FIG. 3b, there is shown a perspective cross-sectional view of the PRIOR ART IGU 300 of FIG. 3a, including the lites 101 and 102, spacer 106 and secondary sealant 307 applied to the perimeter edges of the IGU.

Figure 3C:
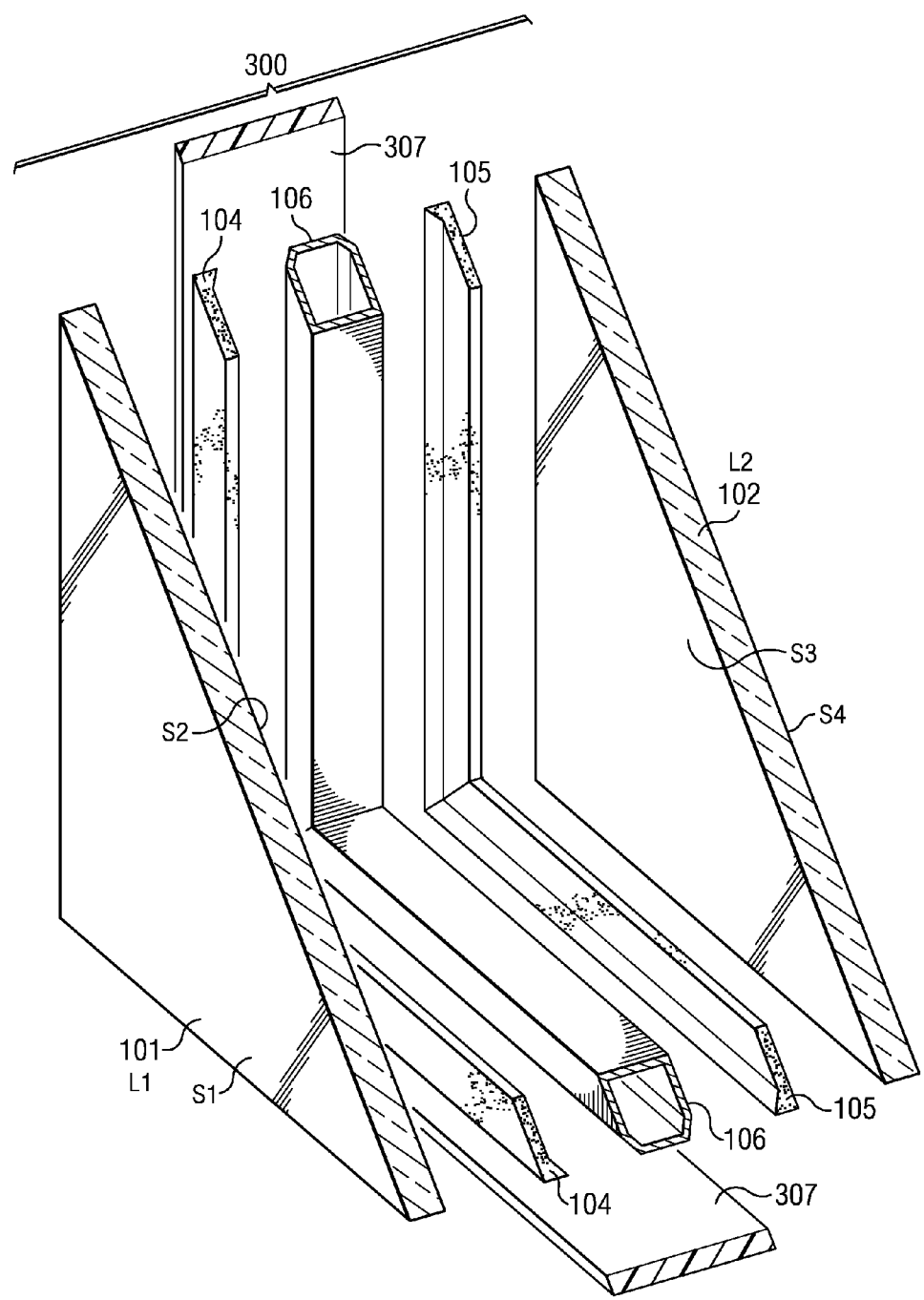
FIG. 3c is an exploded perspective cross-sectional view of the PRIOR ART IGU of FIGS. 3a and 3b.

Referring now to FIG. 3c, there is shown an exploded, perspective cross-sectional view of the PRIOR ART IGU 300 of FIGS. 3a and 3b.

Referring now to FIG. 4, there is shown a cross-sectional view of a multi-pane glass unit in accordance with one embodiment, in this case a double-pane IGU. IGU 400 comprises a first lite 401 (L1), a first adhesive layer 404, a spacer 406, a second adhesive layer 405, a second lite 402 (L2) and an internal cavity 412. In some embodiments, a plurality of stand-off members (not shown) may be provided in the internal cavity to maintain separation of the lites. In this embodiment, a gas-restrictive coating material 408 is disposed along the perimeter edge of the IGU. This gas-restrictive material 408 is applied as part of the IGU's assembly process to the perimeter edge of the IGU, serving as a barrier to reduce the rate of ingress of outside air and moisture into the IGU's cavity 412, and further to reduce the rate of egress (i.e., rate of escape) of any fill-gas inserted into the cavity 412 to a much great extent than conventional secondary sealant material is capable of doing. In this embodiment, there may be no secondary sealant.

Referring now to FIG. 5a, there is shown a cross-sectional view a multi-pane glass unit in accordance with another embodiment of the current invention, in this case a double-pane IGU with secondary sealant. IGU 500 comprises a first lite 501 (L1), a first adhesive 504, a spacer 506, a second adhesive 505 and a second lite 502 (L2), together defining an interior cavity 510. In some embodiments, a plurality of stand-off members (not shown) may be provided in the internal cavity to maintain separation of the lites. A gas-restrictive coating material 508 is disposed along the perimeter edge of the IGU 500, and the coating material is overlaid by a secondary seal or secondary sealant material 507. The secondary seal 507 protects the gas-restrictive material 508 against physical damage. If a fill-gas is used in cavity 512, the coating layer 508 and the secondary sealant 507 may be applied before and/or after the gas fill procedure is performed. Otherwise, the pump-out opening (best seen in FIGS. 17a and 17b) used to fill the cavity 512 would have to be sealed after coating layers 508 and then 507 are applied and after completion of the gas-fill operation.

Figure 5B:
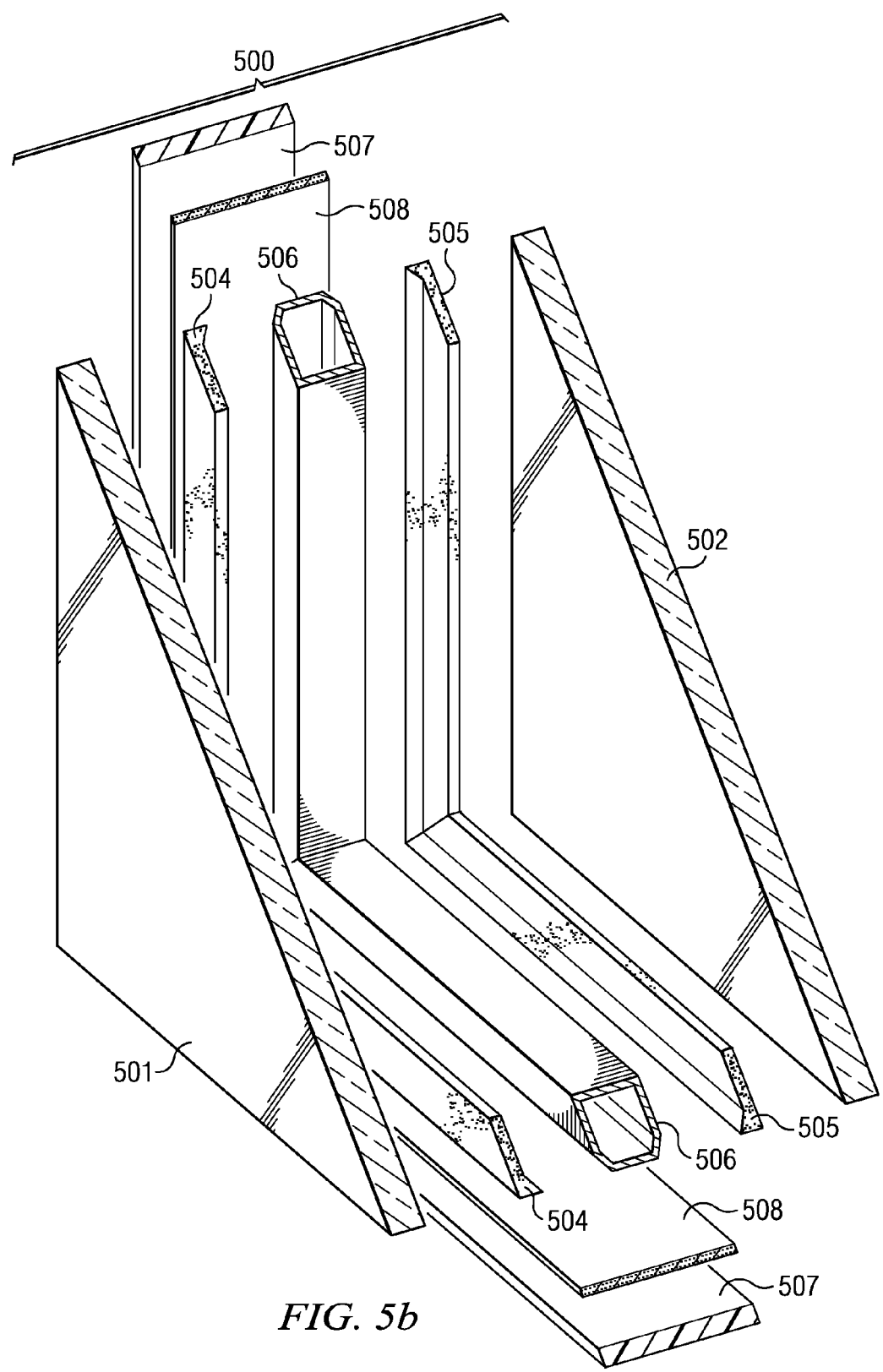

Referring now to FIG. 5b, there is shown an exploded, perspective cross-sectional view of the IGU 500. The gas-restrictive coating material 508 is clearly shown blocking all ingress and egress of gas to/from the cavity 512 through the adhesives 504 and 505 and/or spacer 506.

Figure 5C:
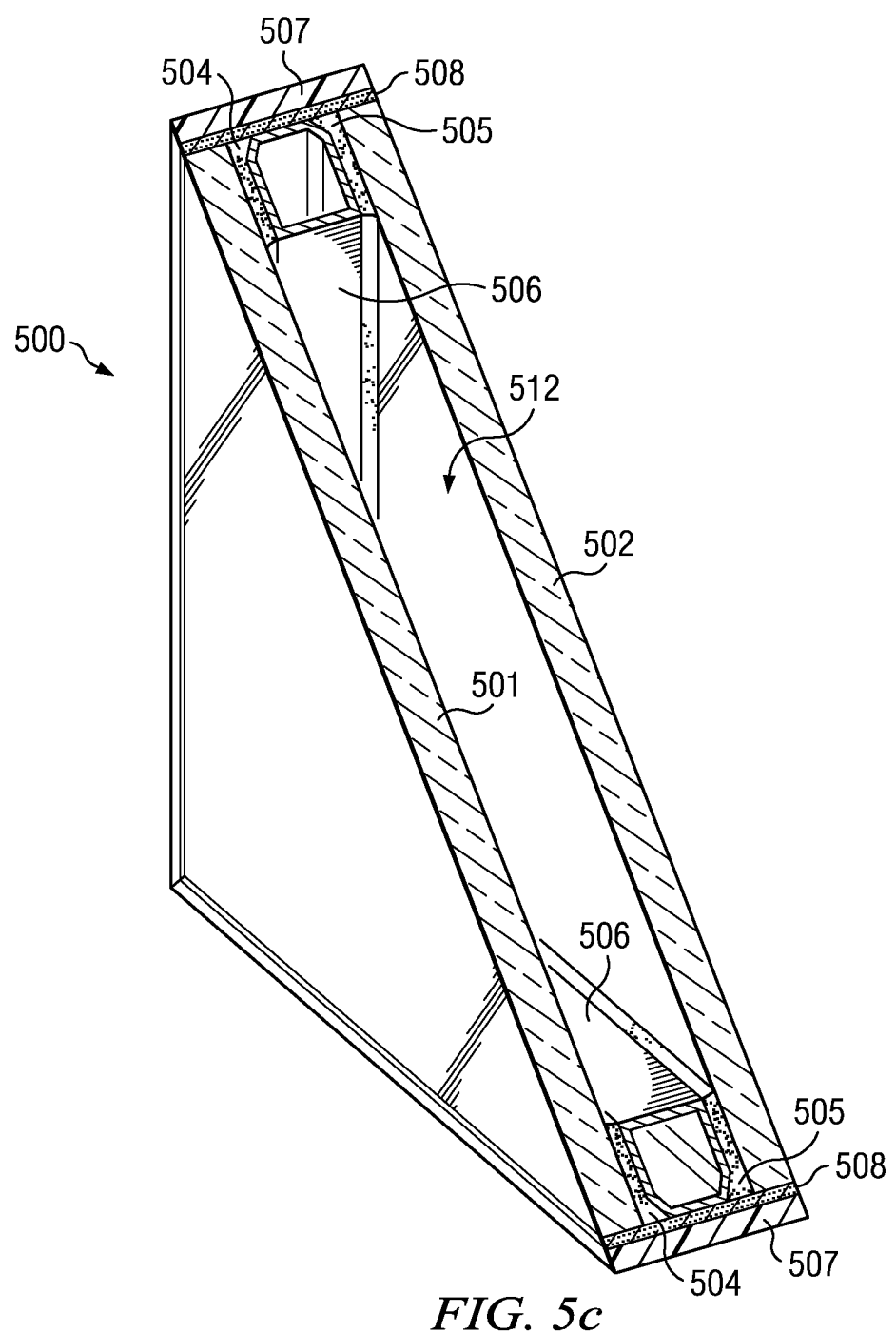
FIG. 5c is a perspective cross-sectional view of the assembled IGU of FIGS. 5a and 5b.

Referring now to FIG. 5c, there is shown a perspective cross-sectional view of the assembled IGU 500 of FIGS. 5a and 5b.

Figure 6A:
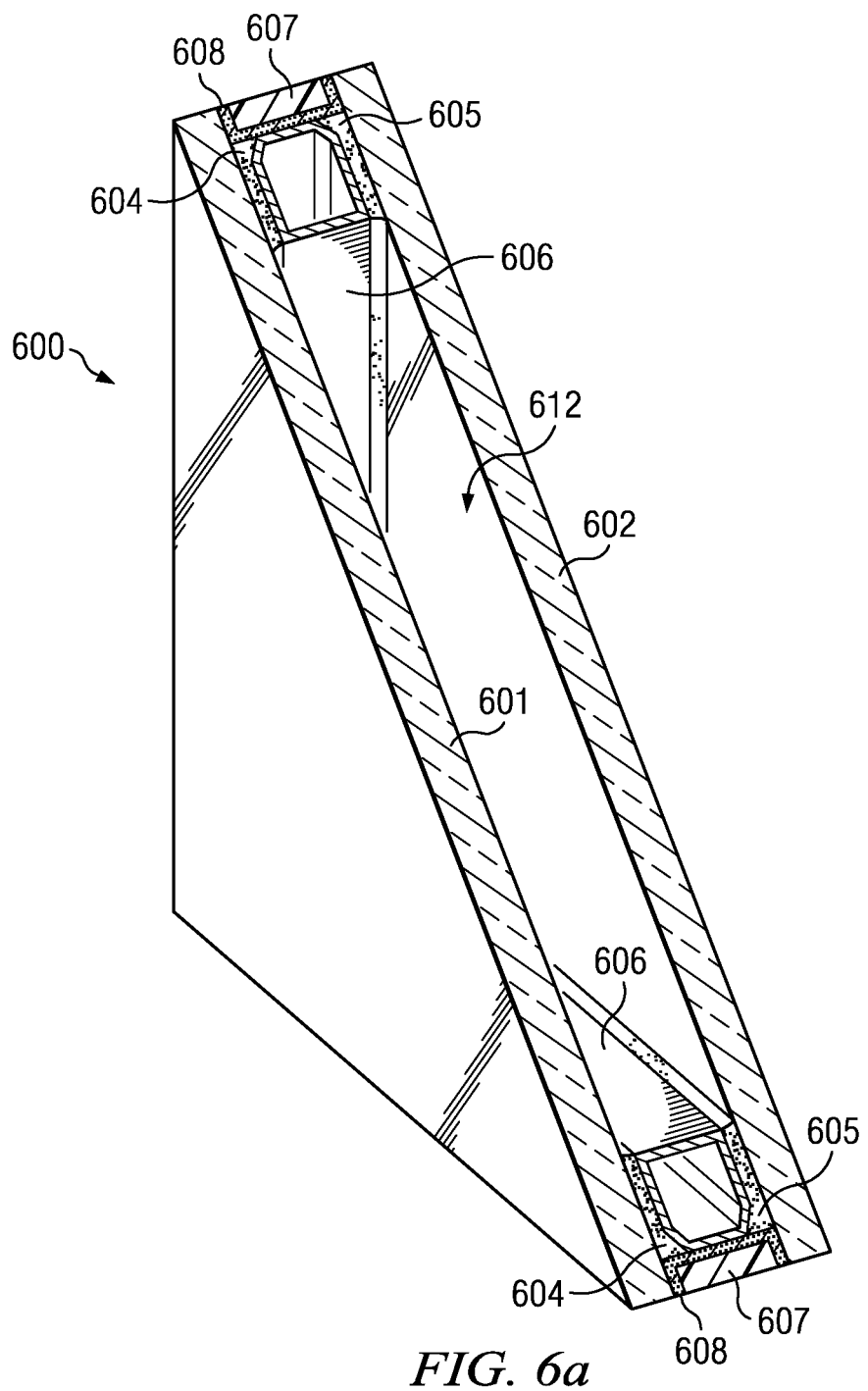
FIG. 6a is an exploded perspective cross-sectional view of another multi-pane glass unit in accordance with an alternative embodiment.

Referring now to FIG. 6a, there is shown a perspective cross-sectional view of a multi-pane glass unit in accordance with another embodiment, in this case a double-pane IGU similar in most respects to IGU 500. The IGU 600 comprises a first lite 601 (L1), a first adhesive 604, a spacer 606, a second adhesive 605 and a second lite 602 (L2), together defining an interior cavity 612. In some embodiments, a plurality of stand-off members (not shown) may be provided in the internal cavity to maintain separation of the lites. A gas-restrictive coating material 608 is disposed along the perimeter edge of the IGU 600, and the coating material is overlaid by a secondary seal or secondary sealant material 607. The secondary seal 607 protects the gas-restrictive material 608 against physical damage. In this embodiment, however, the spacer 606, primary sealant/adhesive 604, 605 bonding the spacer 606 to lites 601, 602, the highly hermetic (i.e., gas-restrictive) coating 608 and the secondary seal 607 are recessed inwards toward the center of the IGU (i.e., disposed substantially between the lites 601, 602). This avoids having the secondary sealant 607 protrude past the perimeter edges of lites 601 and 602.

Figure 6B:
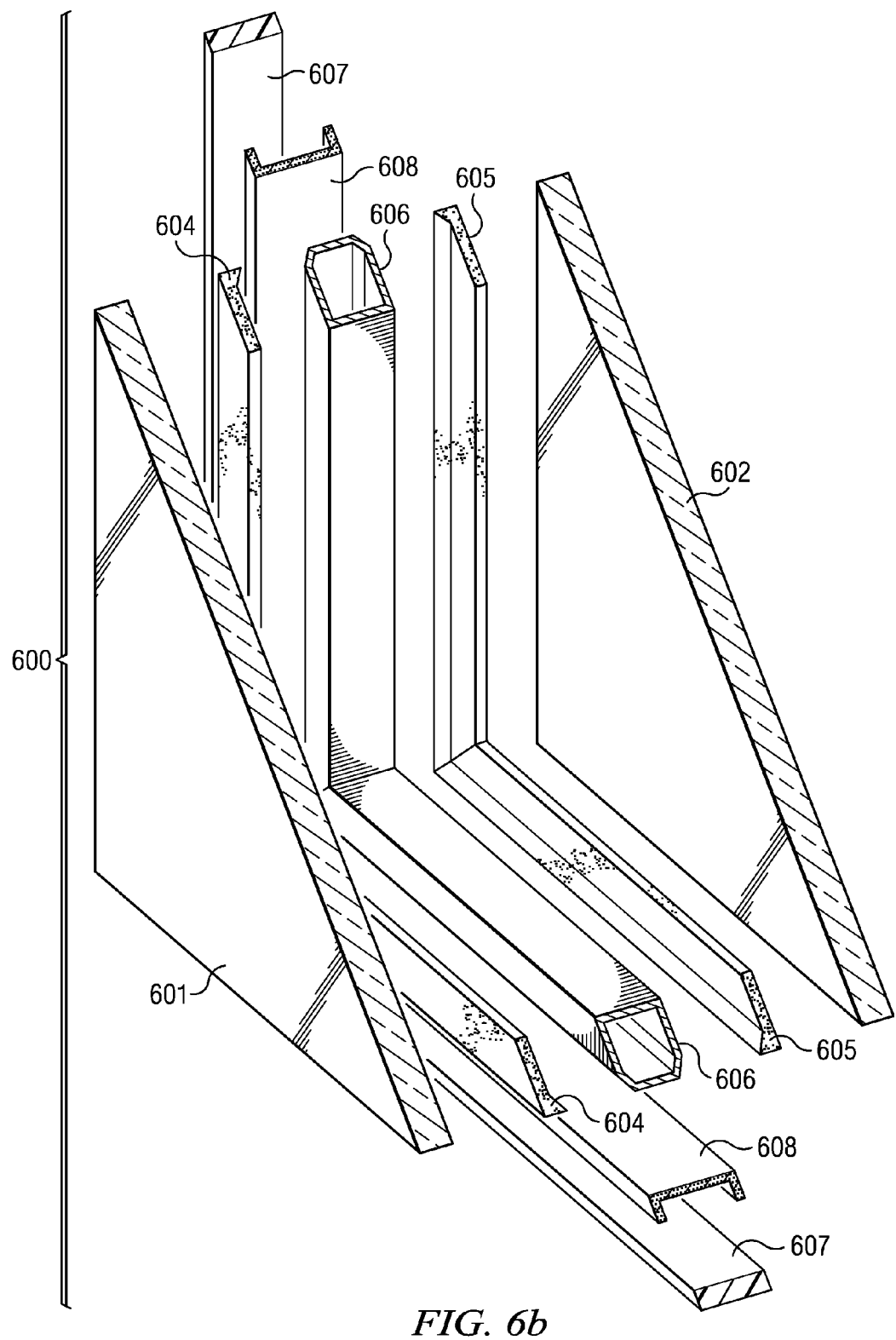

Referring now to FIG. 6b, there is shown an exploded perspective cross-sectional view of a cross-section of the assembled IGU 600 of FIG. 6a. This view clearly shows that the gas-restrictive coating material 608 is configured to completely block gas ingress and egress to/from the cavity 612 even when the seal 606 and adhesives 604, 605 are inset between the lites 601, 602.

Figure 7:
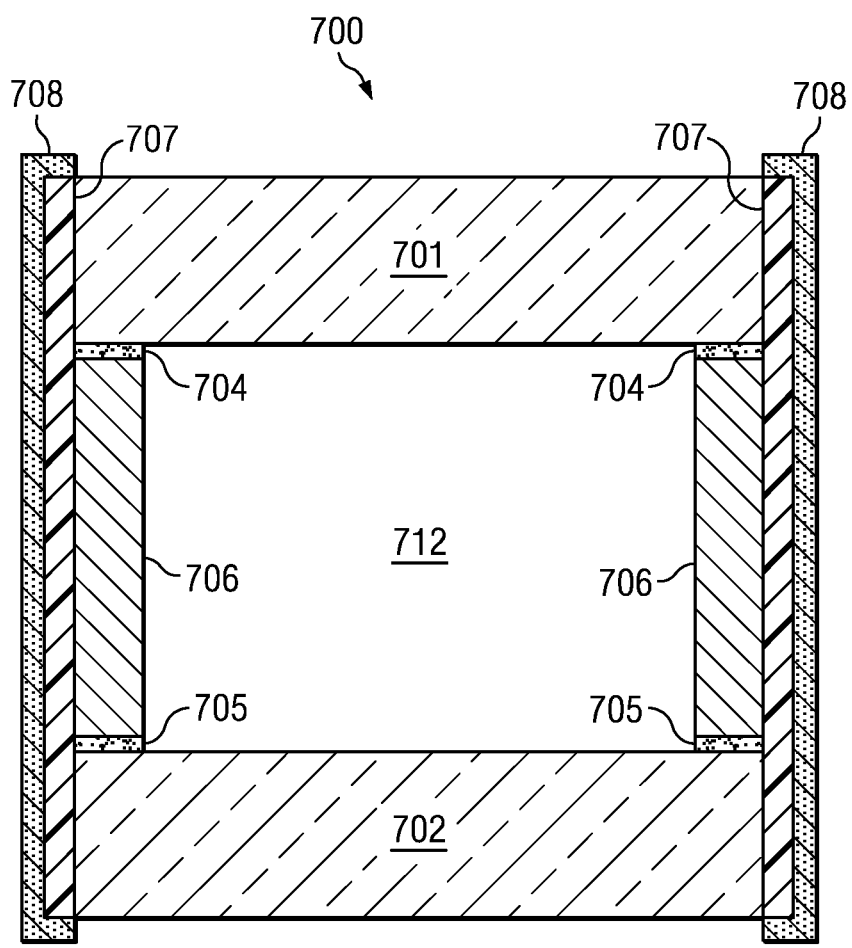
FIG. 7 is a cross-sectional view of still another multi-pane glass unit in accordance with an alternative embodiment.

Referring now to FIG. 7, there is shown a multi-pane glass unit in accordance with still another embodiment of the current invention, in this case a double-pane IGU. IGU 700 comprises a first lite 701, a first adhesive 704, a spacer 706, a second adhesive 705 and a second lite 702, collectively defining an interior cavity 712. In some embodiments, a plurality of stand-off members (not shown) may be provided in the internal cavity to maintain separation of the lites. In this embodiment, a secondary sealant 707 is disposed around the perimeter of the IGU (i.e., directly over the sides of the lites, spacer and adhesives) and a gas-restrictive material 708 is then disposed over the remaining exposed surfaces of the secondary sealant.

Figure 8:
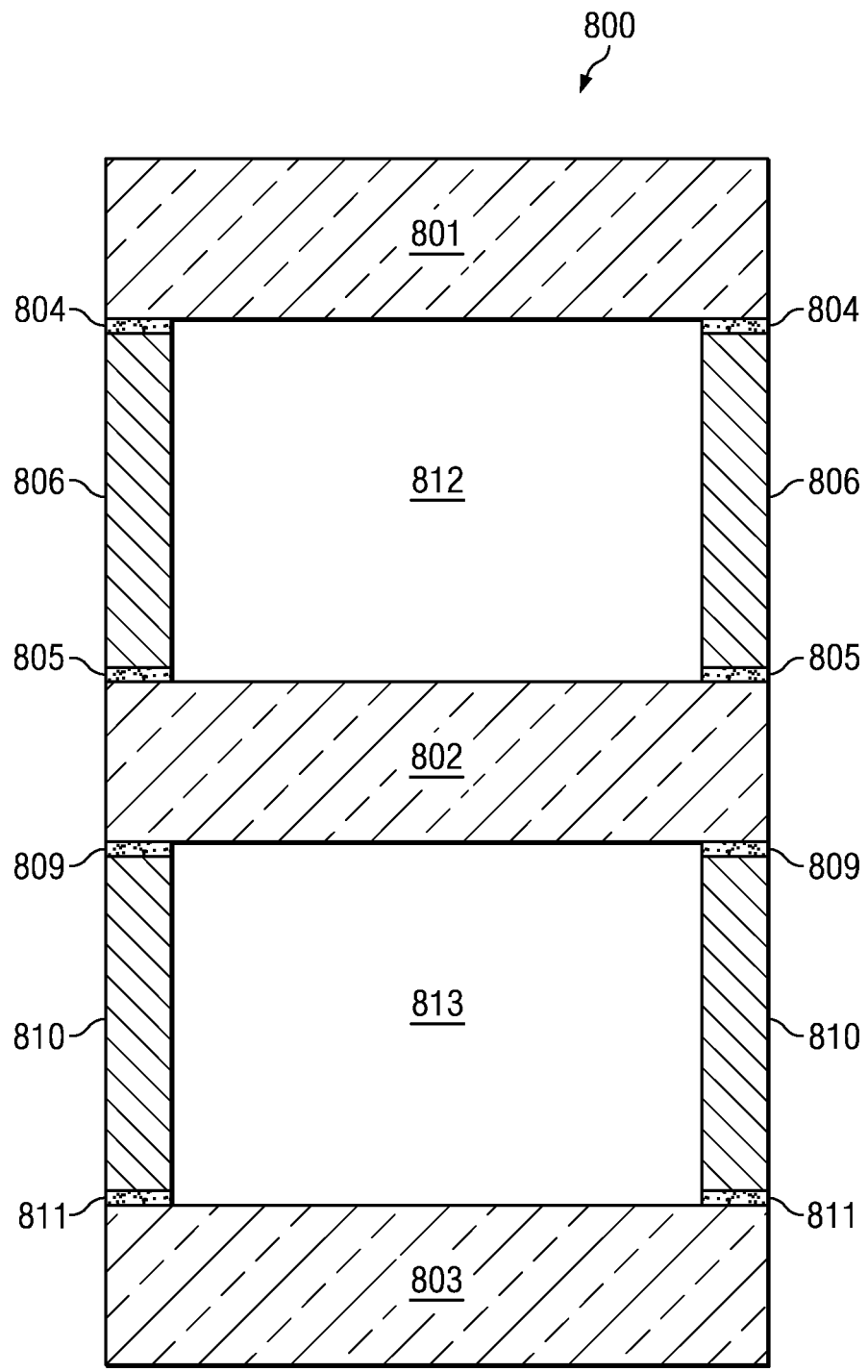
FIG. 8 is a cross-sectional view of another multi-pane glass unit in accordance with the PRIOR ART, in this case a triple-pane IGU.

Referring now to FIG. 8, there is shown a cross-sectional view of a multi-pane glass unit in accordance with the PRIOR ART, in this case a triple-pane or "triple" IGU. A triple IGU is sometimes used instead of a dual-pane or double-pane IGU (FIGS. 1 through 3c), most often to achieve higher insulating properties than a typical dual-pane IGU can achieve. The triple-pane IGU 800 has two insulating cavities 812 and 813 instead of the single cavity of a dual-pane IGU. A triple-pane IGU is usually more insulating than a double-pane IGU because a triple has two insulating cavities for containing air or a fill-gas compared to one cavity in a double-pane IGU. In this example, a first adhesive 804 is used to attach a first lite 801 to a first spacer 806. First spacer 806 is attached to a second lite 802 using a second adhesive material 805. The second lite 802 is attached to a second spacer 810 using a third adhesive 809, and the second spacer 810 is attached to a third lite 803 using a fourth adhesive 811.

Figure 9:
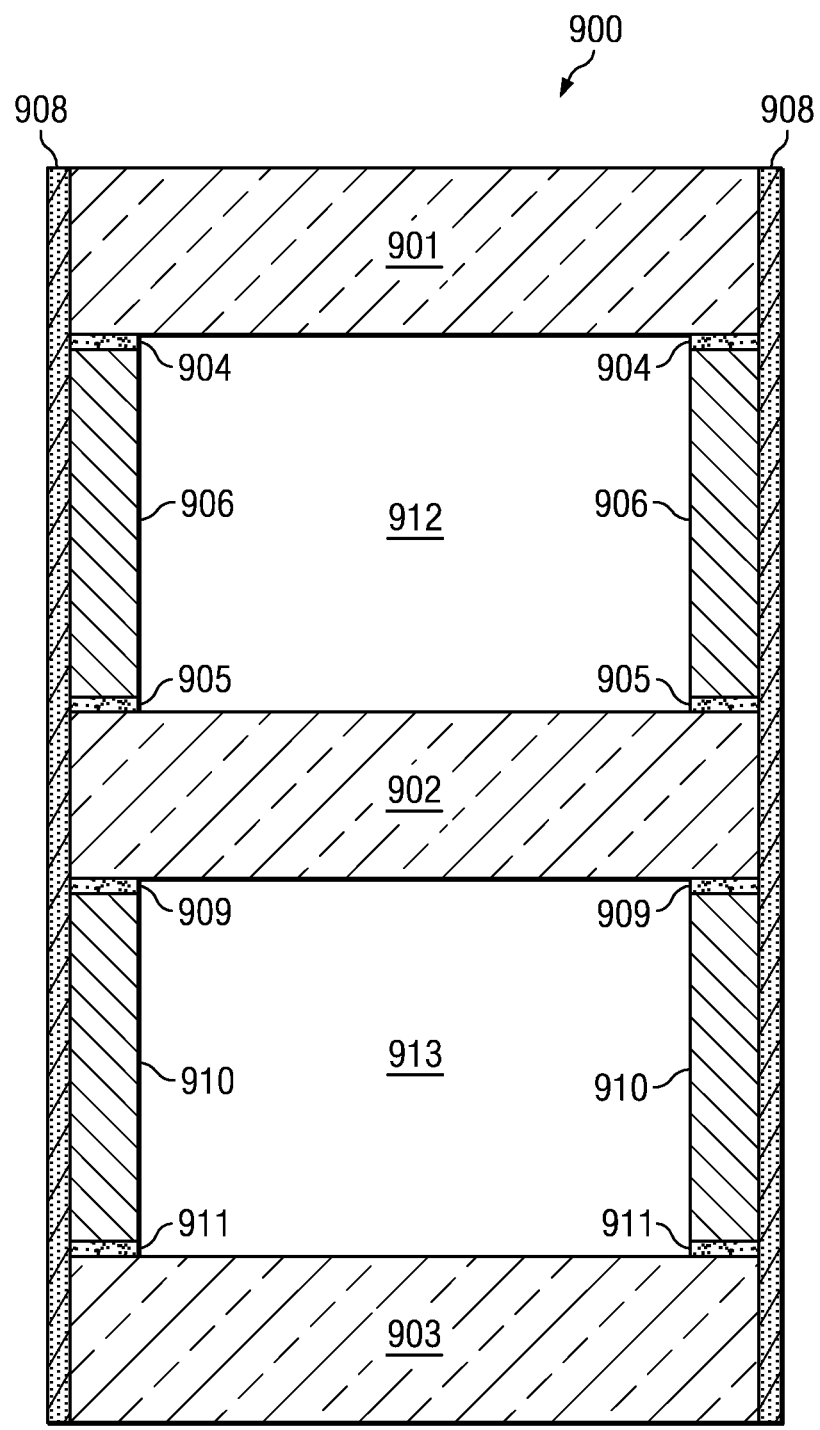
FIG. 9 shows a cross-sectional view of a multi-pane glass unit in accordance with another aspect of the invention, in this case a triple-pane IGU with a gas-restrictive coating.

Referring now to FIG. 9, there is shown a cross-sectional view an assembled multi-pane glass unit in accordance with another embodiment of the current invention, in this case a triple-pane IGU. The triple-pane IGU 900 comprises a first lite 901 attached with a first adhesive 904 to a first spacer 906. The first spacer 906 is attached to a second lite 902 using a second adhesive material 905. The second lite 902 is attached to a second spacer 910 using a third adhesive 909, and the second spacer is attached to a third lite 903 using a fourth adhesive 911. The previously described elements of IGU 900 define two insulating cavities 912 and 913 between the lites 901, 902 and 903. In some embodiments, a plurality of stand-off members (not shown) may be provided in the internal cavities to maintain separation of the lites. IGU 900 further comprises a gas-restrictive coating layer 908 disposed over the sides of the lites 901, 902 and 903, spacers 906 and 910 and adhesives 905, 905, 909 and 911 along on the side of the triple IGU.

Figure 10A:
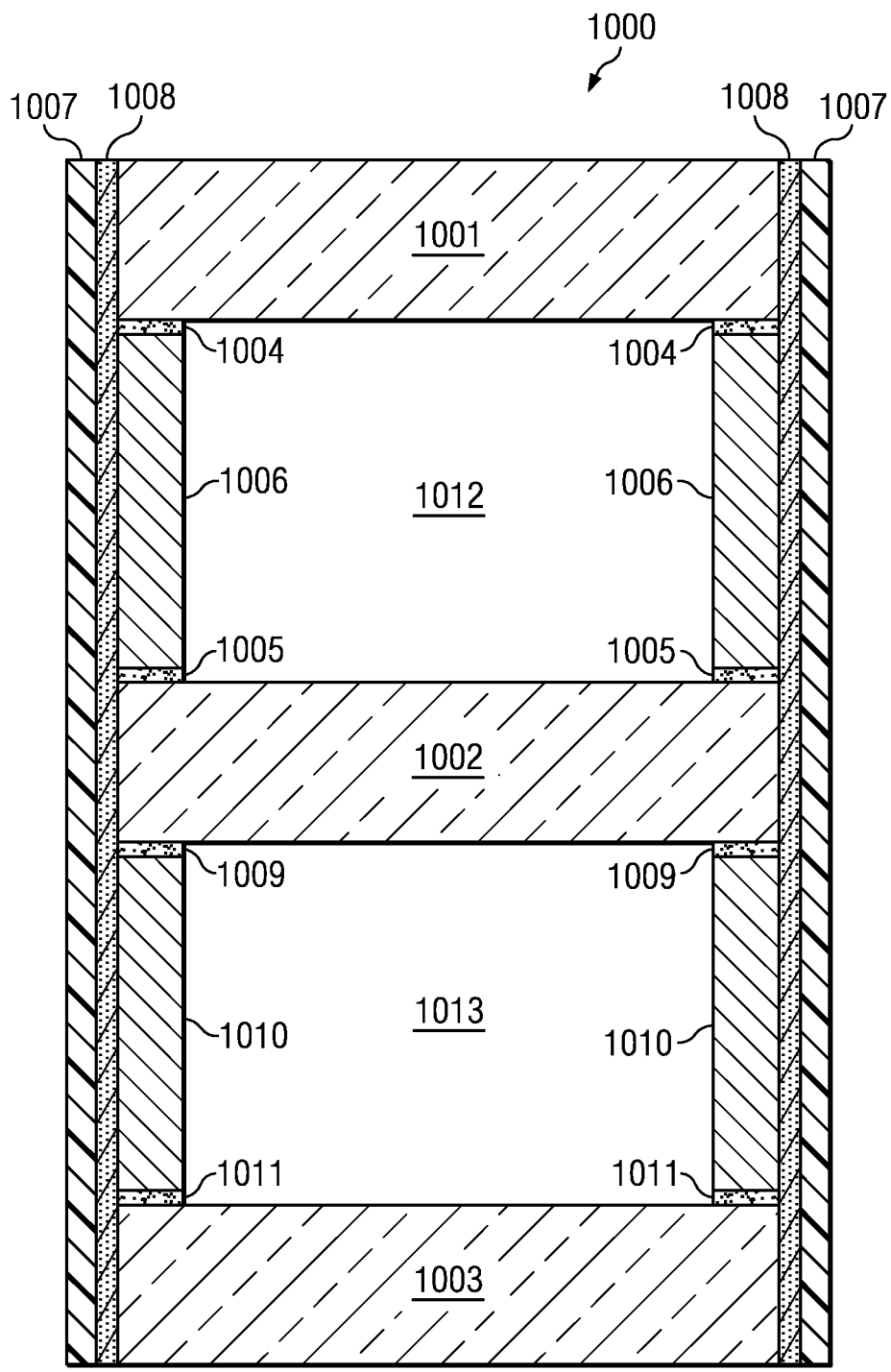
FIG. 10a shows a cross-sectional view of a triple-pane IGU with a gas-restrictive coating and a secondary sealant in accordance with yet another embodiment.

Referring now to FIG. 10a, there is shown a cross-sectional view of a triple-pane IGU in accordance with a preferred embodiment of the current invention. FIG. 10a, in conjunction with FIGS. 10b and 10c, also illustrates a preferred method for using a gas-restrictive coating layer 1008 on a triple IGU. IGU 1000 comprises a first spacer 1006 is attached to a first lite 1001 using a first adhesive material 1004. The first spacer 1006 is attached to a second lite 1002 using a second adhesive material 1005. The second lite 1002 is attached to a second spacer 1010 using a third adhesive 1009, and the second spacer is also attached to a third lite 1003 using a fourth adhesive 1011. The previously described elements of IGU 1000 define two insulating cavities 1012 and 1013 between the lites 1001, 1002 and 1003. In some embodiments, a plurality of stand-off members (not shown) may be provided in the internal cavities to maintain separation of the lites. A gas-restrictive coating layer 1008 is applied to the perimeter edges of the lites 1001, 1002 and 1003, spacers 1006 and 1010 and adhesives 1005, 1005, 1009 and 1011 of the assembled IGU 1000. A secondary sealant 1007 may be applied over the gas-restrictive coating layer 1008 to protect it from physical damage. If a fill-gas is used in cavities 1012 and 1013, the coating layer 1008 may be applied before or after the gas fill procedure is performed.

Figure 10B:
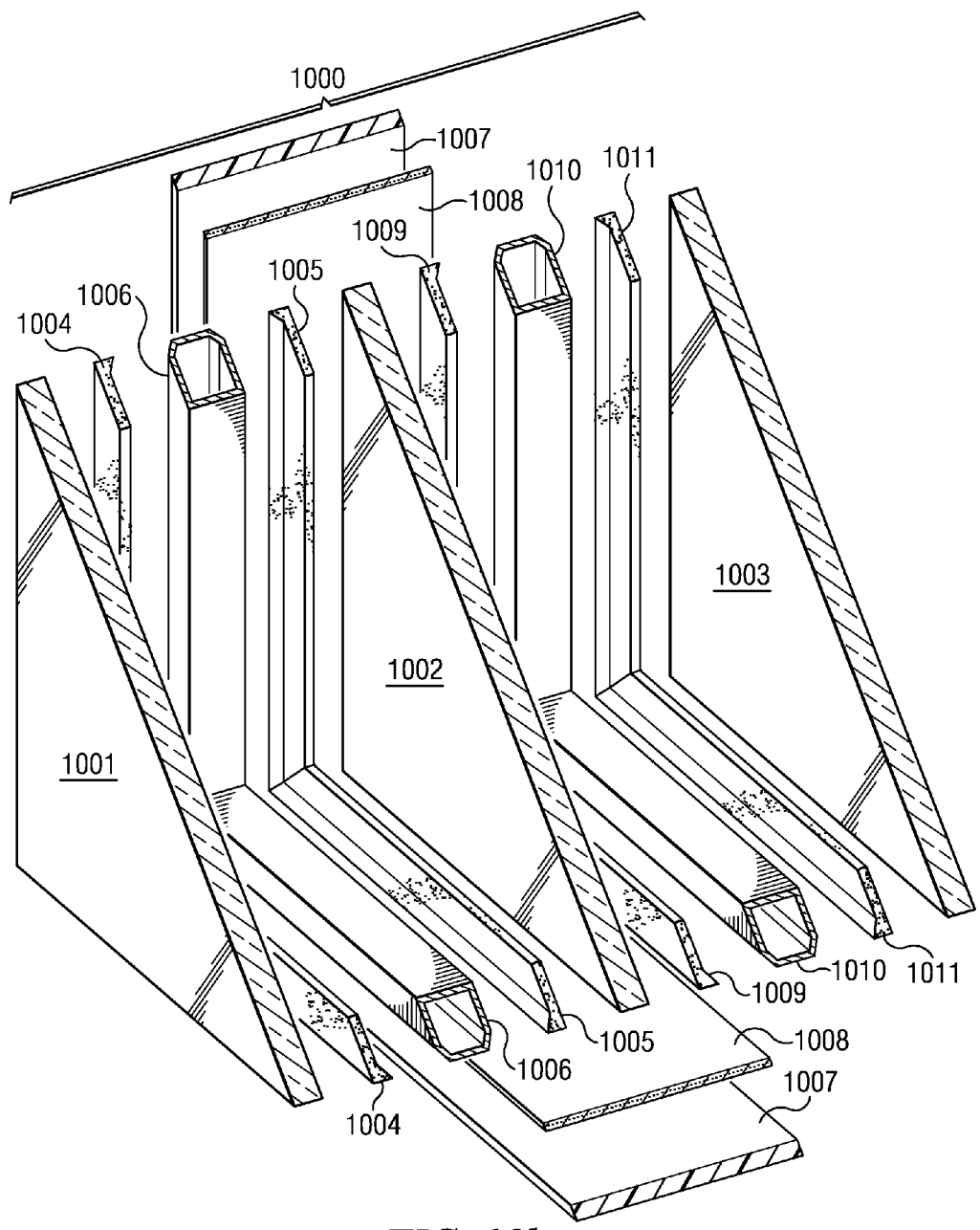

Referring now to FIG. 10b, there is shown an exploded perspective cross-sectional view the IGU 1000 of FIG. 10a.

Figure 10C:
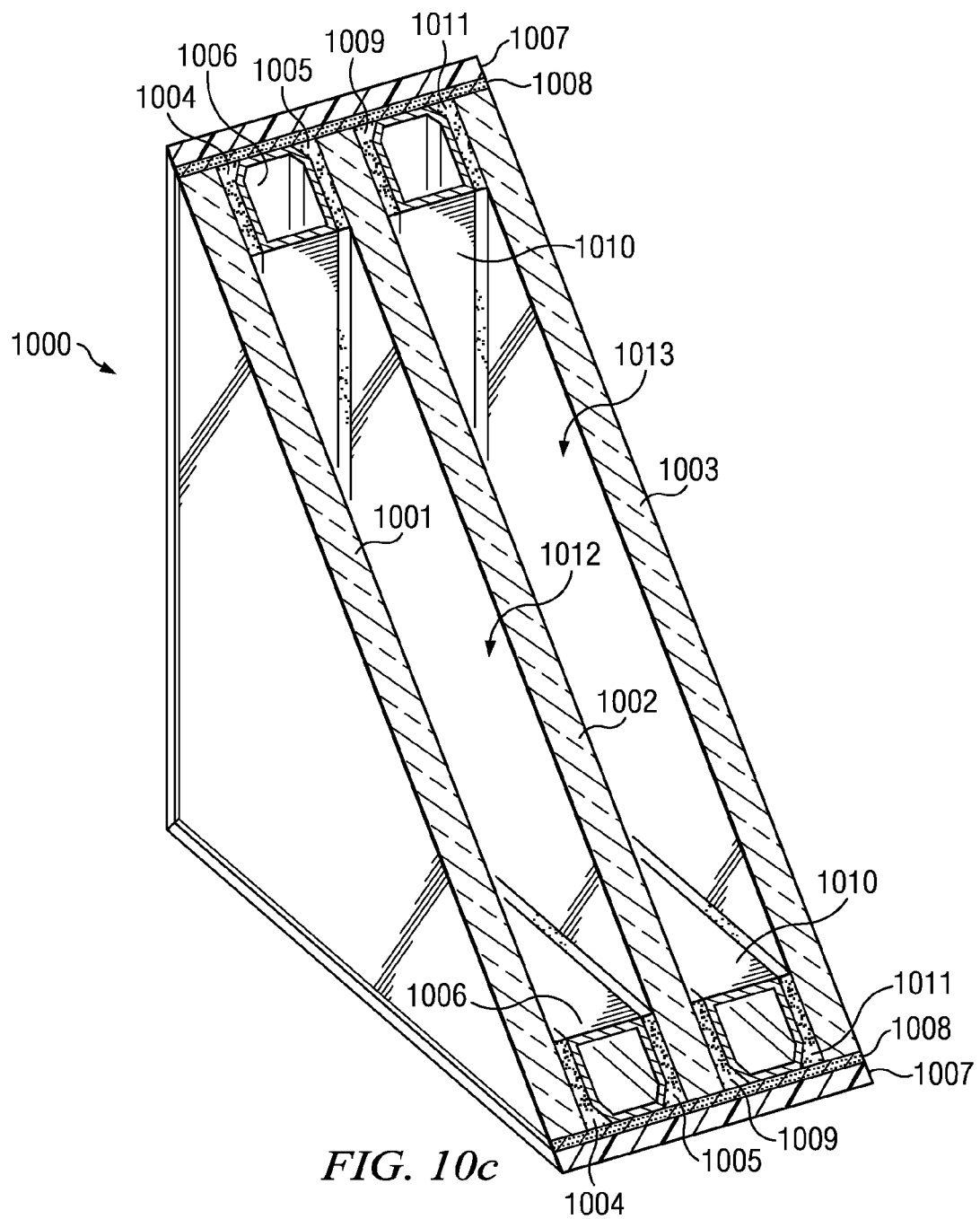
FIG. 10c is a perspective cross-sectional view of the assembled triple-pane IGU of FIGS. 10a and 10b.

Referring now to FIG. 10c, there is shown a perspective cross-sectional view of the assembled IGU 1000 of FIGS. 10a and 10b.

Figure 11:
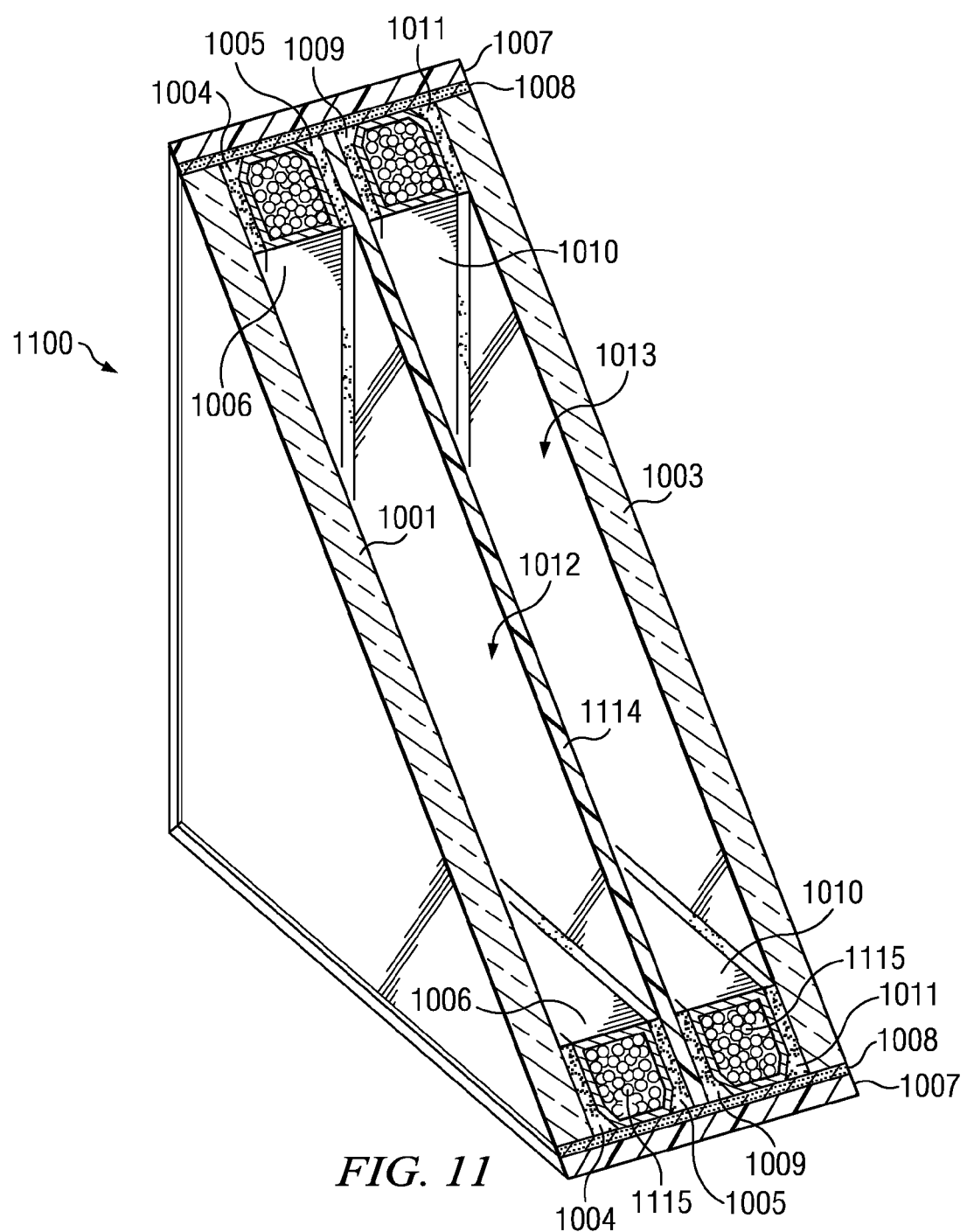
FIG. 11 shows a cross-sectional view of a suspended-film IGU with a gas-restrictive coating in accordance with yet another embodiment.

Referring now to FIG. 11, there is shown a cross-sectional view of a suspended-film IGU in accordance with a yet another embodiment. The construction of IGU 1100 is similar in most respects to IGU 1000 of FIGS. 10a, 10b and 10c, except that the glass second lite is replaced with a suspended film 1114. The suspended film 1114 may be formed of a plastic, polymer or other material known for use as suspended films. The suspended film 1114, along with the other components, defines insulating cavities 1012 and 1013. Optionally, a secondary sealant material (not shown) may be used to cover the perimeter edges of the suspended film IGU 1100. A desiccant material 1115 may be provided in the interior of the first spacer 1006 and/or in the interior of the second spacer 1010.

Figure 12A:
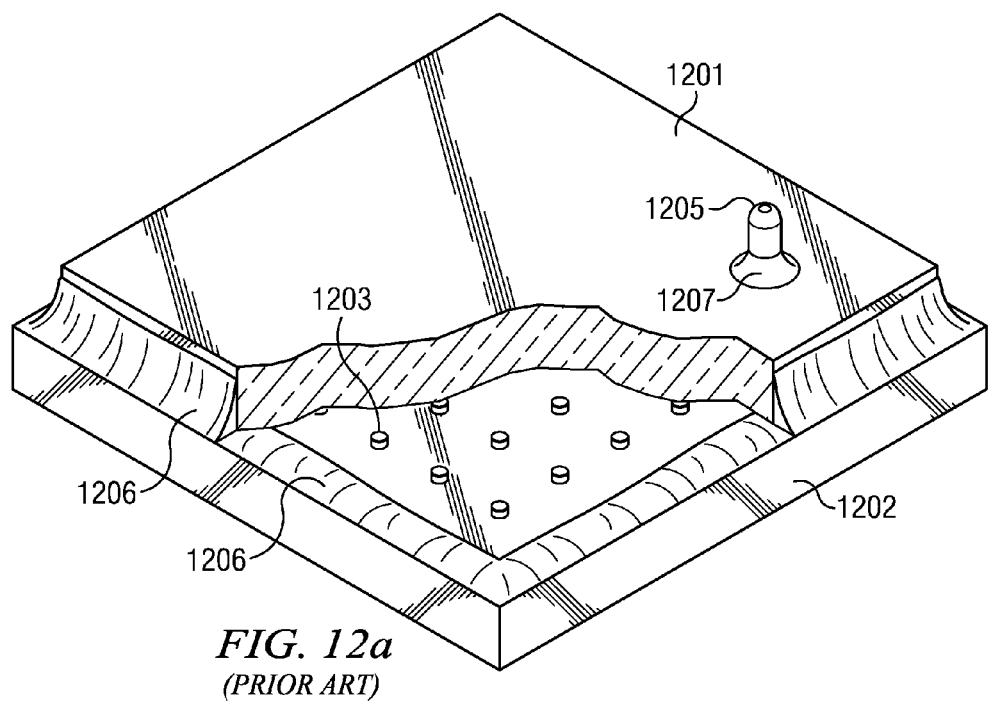
FIGS. 12a and 12b show a perspective cut-away view and a side cross-sectional view, respectively, of a dual-pane VIGU using a solder glass edge seal and a pump-out tube in accordance with the PRIOR ART.
Figure 12B:
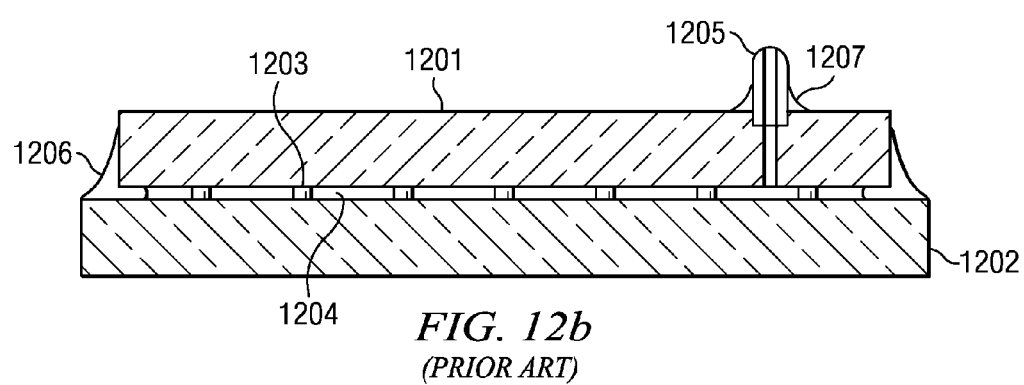

Referring now to FIGS. 12a and 12b, there is shown a perspective cut-away view (FIG. 12a) and a side cross-sectional view (FIG. 12b) of a dual-pane VIGU in accordance with the PRIOR ART. The VIGU 1200 comprises a first lite 1201 and a second lite 1202 spaced apart by a plurality of support pillars 1203 to define a cavity 1204 therebetween. An edge seal 1206 formed of solder glass is provided around the periphery of the lites 1201 and 1202 to isolate the cavity 1204. A pump-out tube 1205 is provided on one of the lites for evacuating the cavity 1204 after the assembly of the VIGU. The pump-out tube 1205 may also have a solder-glass edge seal 1207. This type of VIGU (similar to the "SPACIA" brand by NSG) is considered to have a "rigid edge seal" due to the low or non-flexibility of the solder-glass seal system.

Figure 13A:
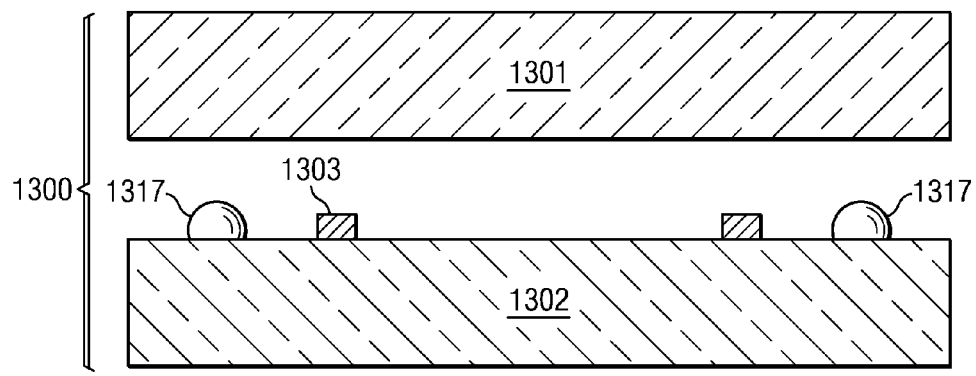
FIGS. 13a to 13c illustrates a method for producing a rigid-edge VIGU in accordance with another aspect of the current invention.
Figure 13B:
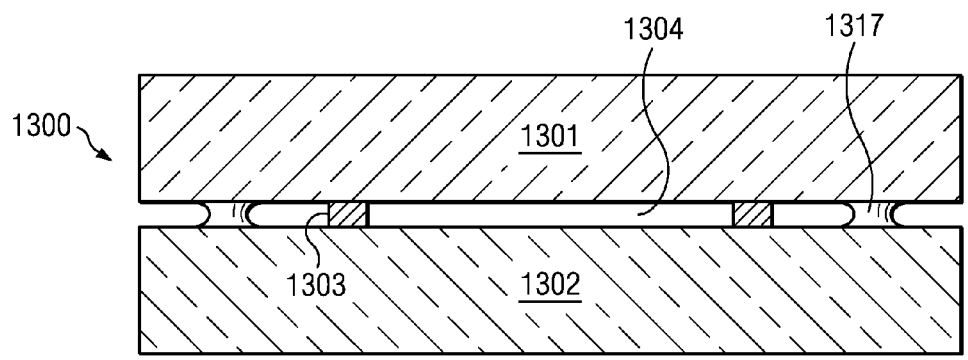
Figure 13C:
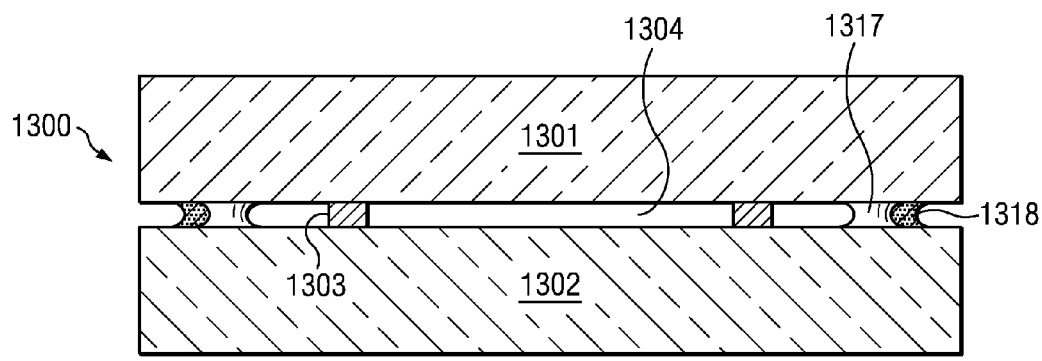

Referring now to FIGS. 13a to 13c, there is illustrated a method for producing a rigid-edge VIGU in accordance with another aspect of the current invention. As seen in FIG. 13a, a VIGU 1300 comprises a first lite 1301, a second lite 1302 spaced apart from the first lite, and a plurality of stand-offs 1303 that maintain the separation between the lites to form an internal cavity 1304 therebetween. As seen in FIG. 13b, a solder glass seal 1317 is made inside the perimeter (i.e., the lateral boundaries) of the VIGU 1300. As seen in FIG. 13c, a highly hermetic coating 1318 is applied to the outside-facing fillet of the solder glass (the side opposite the VIGU's internal cavity 1304). A pump-out tube (not shown) may be provided to allow evacuation of the internal cavity 1304.

Figure 14A:
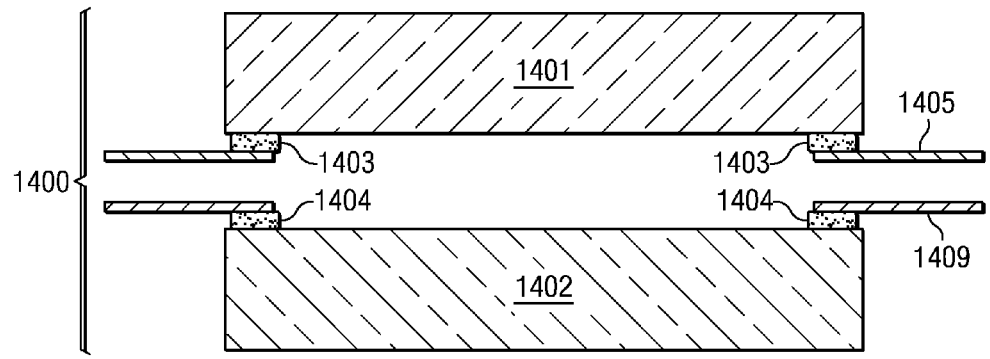
FIGS. 14a, 14b and 14c show cross-sectional views of a multi-pane glass unit (during construction and complete) in accordance with other aspects of the invention, in this case a double-pane VIGU.
Figure 14B:
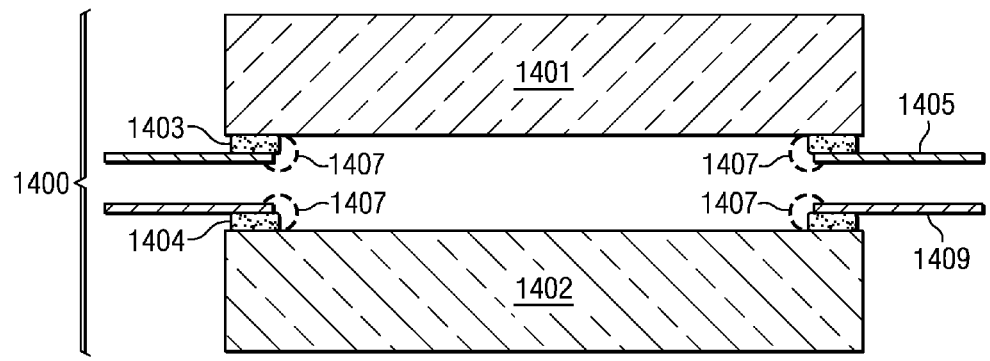
Figure 14C:
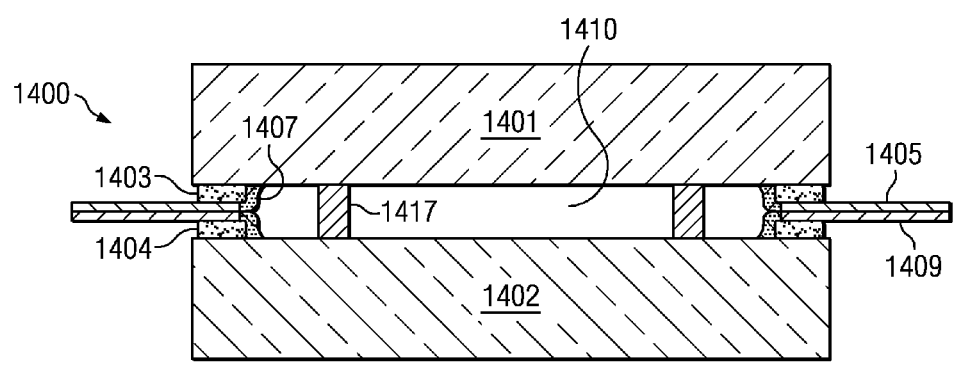

Referring now to FIGS. 14a, 14b and 14c, there is shown a cross-sectional view of a multi-pane glass unit in accordance with another aspect of the invention, in this case a double-pane VIGU. A method of producing the VIGU is also illustrated. The VIGU 1400 comprises a first lite 1401 and a second lite 1402 spaced apart by a plurality of support pillars 1417 (FIG. 14c) to define a cavity 1410 therebetween (FIG. 14c). A pump-out tube (not shown) may be provided on one of the lites for evacuating the cavity 1410 after the assembly of the VIGU 1400. As best seen in FIG. 14a, a first metal-foil frame 1405 is attached to the inner surface (S2) of the first lite 1401 using a first adhesive 1403 and a second metal-foil frame 1409 is attached to the inner surface (S3) of the second lite 1402 using a second adhesive 1404. As seen in FIG. 14b, after adhesive bonding, the exposed portions of the adhesives 1403 and 1404 on what will become the adhesive's cavity-facing surface (i.e., cavity 1410) are subsequently coating with the highly hermetic material 1407. In the VIGU 1400, the coating 1407 is directed just over the area of the adhesive, and the rest of the window and metal are uncoated (e.g., through the use of directional application of the coating, or through masking). Subsequently, the stand-offs 1507 for maintaining mechanical separation of the lites are placed on or attached to surfaces S2 and/or S3, and the lites 1401 and 1402 are brought into contact with the stand-offs. As seen in FIG. 14*c*, the outside perimeters of the two metal-foil frames 1405 and 1409 may then be welded together (or joined with another known hermetic metal joining process) to complete the hermetic seal. Evacuation of the cavity 1410 may be accomplished by use of the pump-out tube (if provided), or alternatively, by performing the final weld with the VIGU assembly located in an evacuated (i.e., vacuum) chamber.

Figure 15A:
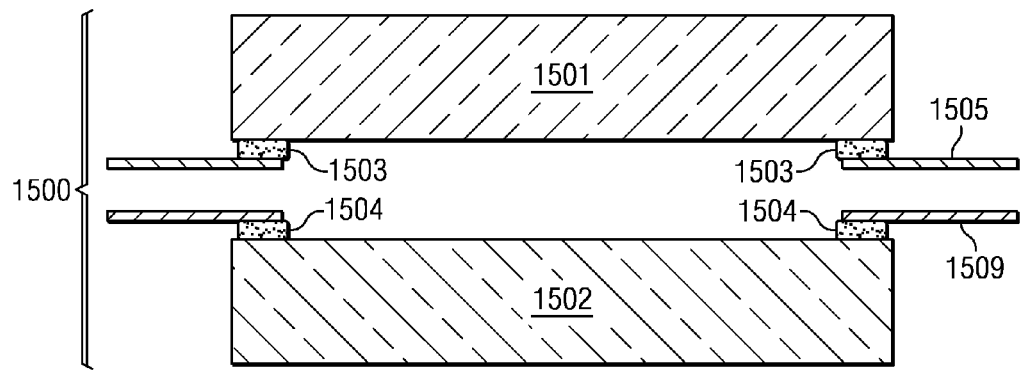
FIGS. 15a, 15b and 15c show cross-sectional views of another multi-pane glass unit (during construction and complete) in accordance with still further aspects of the invention, in this case a double-pane VIGU.
Figure 15B:
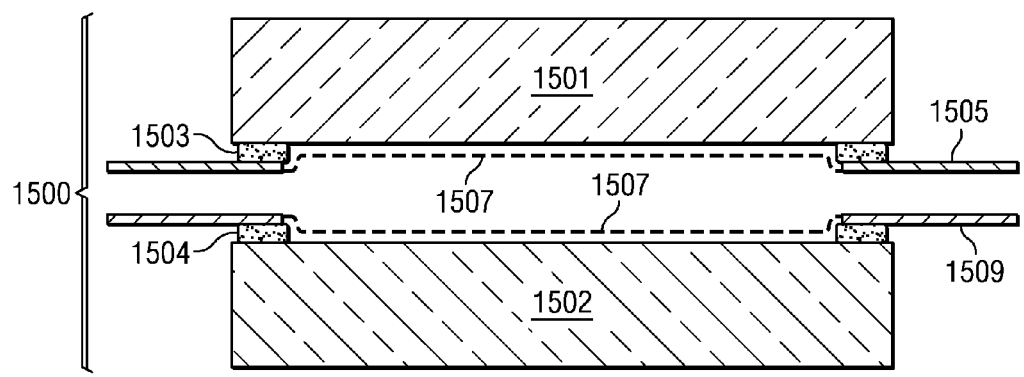
Figure 15C:
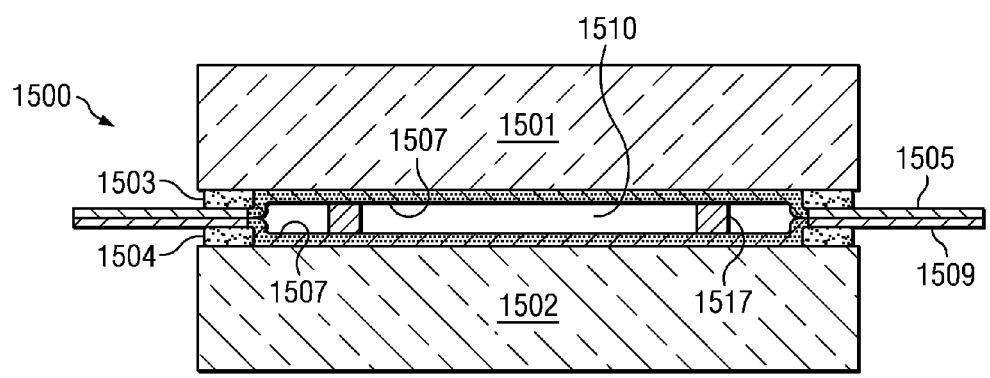

Referring now to FIGS. 15*a*, 15*b* and 15*c*, there is shown a cross-sectional view of a multi-pane glass unit in accordance with yet another aspect of the invention, in this case an alternative double-pane VIGU. A method of producing the VIGU is also illustrated. The VIGU 1500 is similar in most respects to that of FIGS. 14*a*, 14*b* and 14*c*, comprising a first lite 1501 and a second lite 1502 spaced apart by a plurality of stand-off members (support pillars) 1517 (FIG. 15*c*) to define a cavity 1510 therebetween. A pump-out tube (not shown) may be provided on one of the lites for evacuating the cavity 1510 after the assembly of the VIGU 1500. As best seen in FIG. 15*a*, a first metal-foil frame 1505 is attached to the inner surface of the first lite 1501 using a first adhesive 1503 and a second metal-foil frame 1509 is attached to the inner surface of the second lite 1502 using a second adhesive 1504. After adhesive bonding, the exposed portions of the adhesives 1503 and 1504 on what will become the adhesive's cavity-facing surface are subsequently coating with the highly hermetic material 1507. As best seen in FIG. 15*b*, in the VIGU 1500, all of the cavity-facing surfaces (i.e., adhesive, metal, and glass) are coated with the coating 1507. In still another embodiment (not shown) both the cavity-facing and outside-facing surfaces may be coated. Subsequently, the stand-offs 1507 are placed on or attached to the inner surfaces of the lites 1501 and/or 1502, and both lites are then brought into contact with the stand-offs. As seen in FIG. 15*c*, the outside perimeters of the two metal-foil frames 1505 and 1509 may then be welded together (or otherwise hermetically joined) to complete the hermetic seal. Evacuation of the cavity 1510 may be accomplished by use of the pump-out tube (if provided), or alternatively, by performing the final weld with the VIGU assembly located in an evacuated (i.e., vacuum) chamber.

Figure 16A:
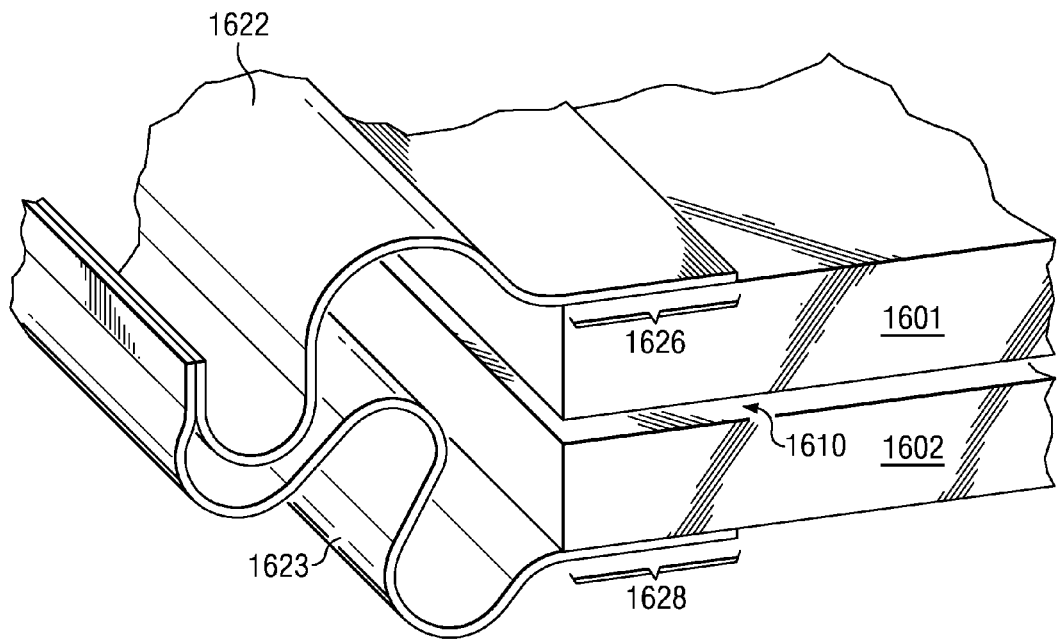
FIGS. 16a and 16b show two perspective cross-sectional views of a VIGU comprising a two-piece flexible metal seal system.
Figure 16B:
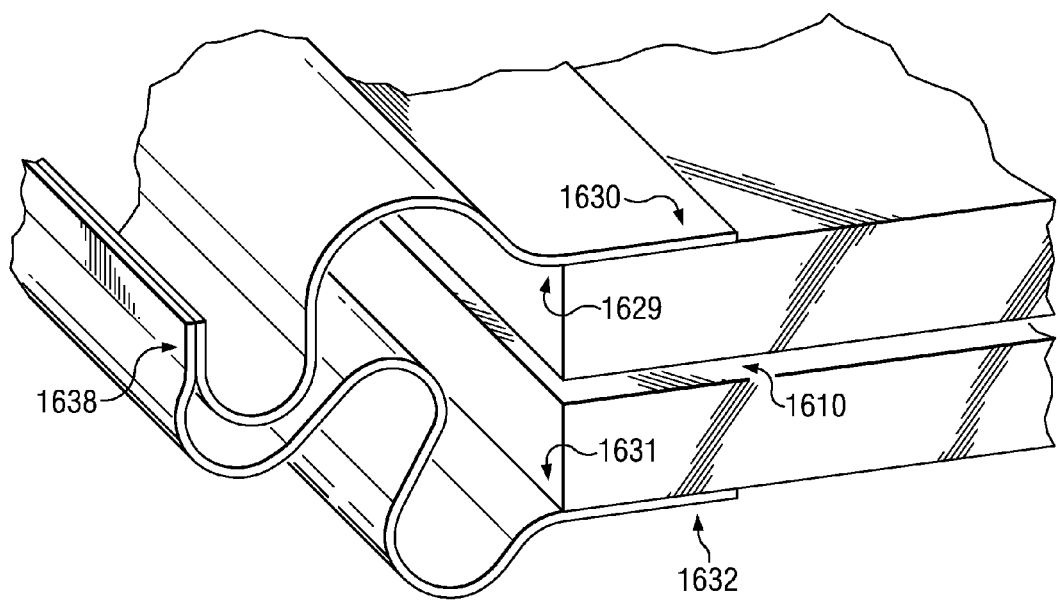

Referring now to FIGS. 16*a* and 16*b*, there are illustrated two perspective cross-sectional views of a VIGU 1600 comprising a two-piece flexible metal seal system made of first and second pre-formed metal pieces 1622 and 1623 (sometimes referred to as a bellows) for creating a hermetic seal between a first lite 1601 and a second lite 1602. The lites 1601 and 1602 are spaced apart to form a cavity 1610 therebetween. As best seen in FIG. 16*a*, the first metal bellows piece 1622 may be bonded directly to the first glass lite 1601 at the first glass-to-metal bond region 1626, and the second metal bellows piece 1623 may be bonded directly to the second glass lite 1602 at the second glass-to-metal bond region 1628. As best seen in FIG. 16*b*, the first metal bellows piece 1622 has a cavity-facing seal exposure 1629 on bond region 1626 and an ambient atmosphere seal exposure 1630 on bond region 1626. Similarly, the second metal bellows piece 1623 has a cavity-facing seal exposure 1631 on bond region 1628 and an ambient atmosphere seal exposure 1632 on bond region 1628. After assembly of this VIGU 1600, including the placement of a stand-off system (not shown) between lites 1601 and 1602 to prevent the two lites from coming into contact with each other, the VIGU 1600 is sealed shut in a vacuum by welding the two bellows together at their perimeters 1638. Alternatively, the cavity 1610 may be evacuated by the use of a pump-out tube (not shown). There are several known methods for producing hermetic glass-to-metal bonds, including but not limited to soldering the metal to a pre-metalized surface of the glass with a metal alloy solder; using a glass frit material (a solder glass) to solder the metal to the glass surface; diffusion bonding the glass to the metal; and chemically bonding the glass to the metal using a catalyst to assist with some form of mechanical agitation such as ultrasonic bonding.

Figure 16C:
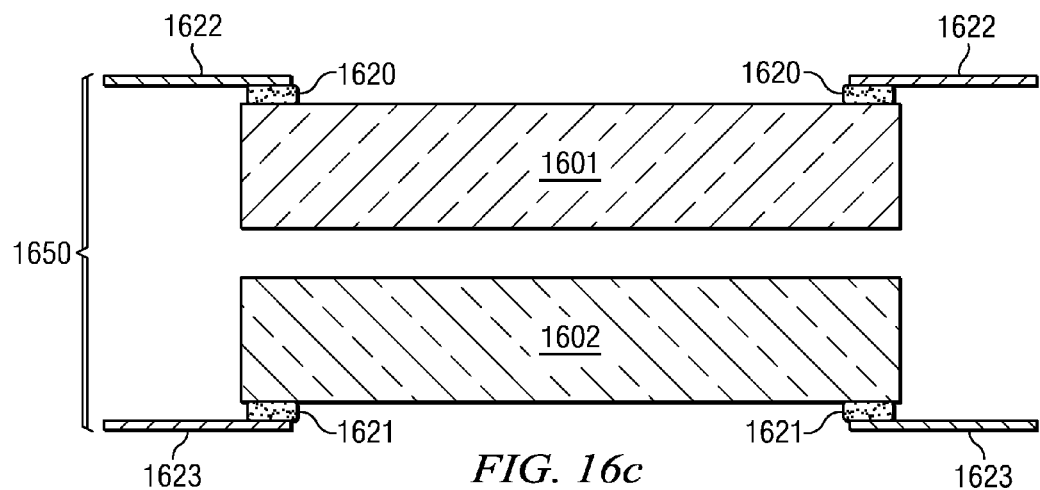
FIGS. 16c, 16d, 16e and 16f show additional preferred embodiments of a VIGU in accordance with the invention, and methods of making same.
Figure 16D:
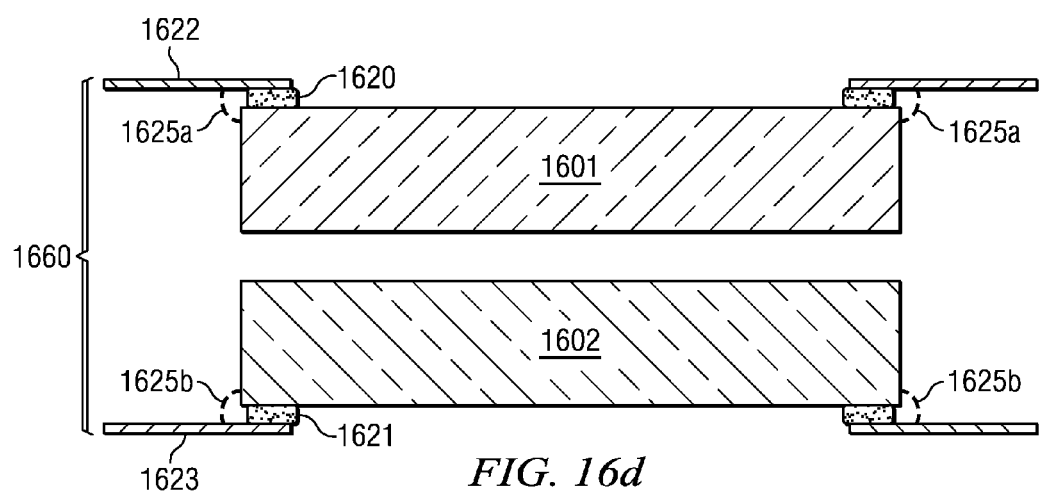
Figure 16E:
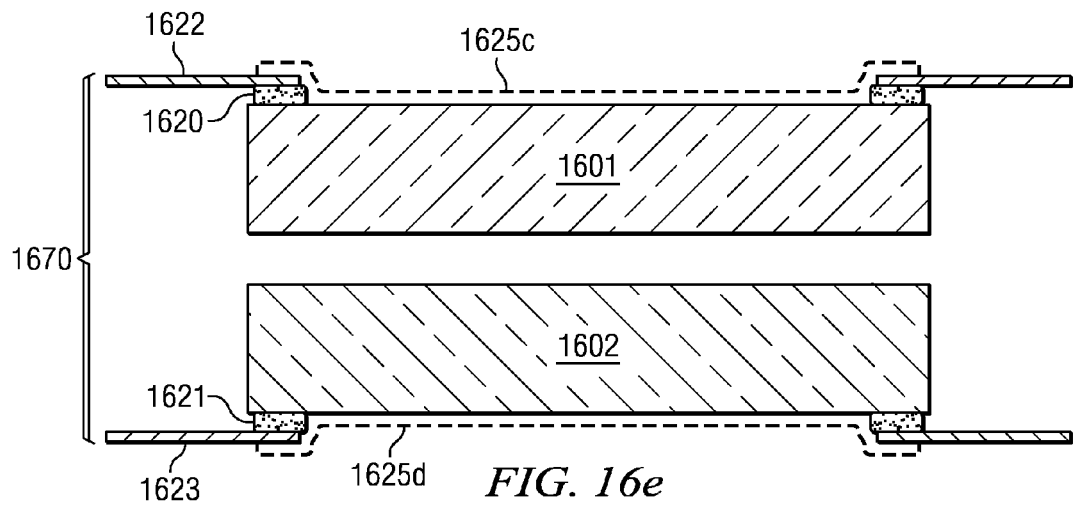

Referring now to FIGS. 16*c*, 16*d*, 16*e* and 16*f*, there are illustrated additional preferred embodiments of a VIGU in accordance with the invention, and methods of making same. Similar in many respects to the embodiments of FIGS. 16*a* and 16*b*, in these embodiments a two-piece flexible metal seal system comprising preformed metal members ("bellows") 1622 and 1623 is used to create the hermetic seal between lites 1601 and 1602. As seen in FIG. 16*c*, a first metal bellows member 1622 is bonded with an adhesive 1620 to a first lite 1601. A second metal bellows member 1623 is bonded with an adhesive 1621 to a second lite 1602. Subsequent to the adhesive glass-to-metal bonding process, at least some of the exposed surfaces of adhesives 1620 and 1621 (i.e., the surfaces that will later be exposed to the cavity 1610 containing the high vacuum) are covered with a highly hermetic coating 1625. As shown in FIG. 16*d*, the adhesive 1620 may be coated with gas-restrictive coating material 1625*a* and the adhesive 1621 may be coated a gas-restrictive coating 1625*b* (which may be the same material as 1625*a*). In some embodiments (e.g., FIG. 16*d*), only the cavity-facing surfaces of the adhesive 1620 and 1621 are coated with the highly-hermetic layers 1625*a* and 1625*b*. In other embodiments (e.g., FIG. 16*e*), the VIGU's outside-facing glass surfaces S1 (of lite 1601) and S4 (of lite 1602) may be coated with a highly-hermetic material layer 1625*c* on surface S1 and 1625*d* on surface S4. This second approach does not require directing the coating only onto the exposed adhesive surfaces or masking the glass during the coating application processes.

Figure 16F:
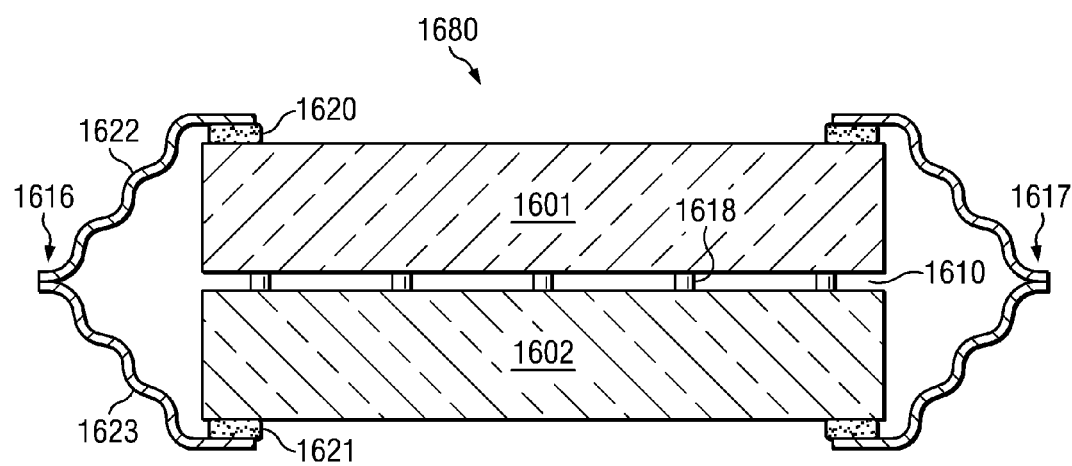

As seen in FIG. 16*f*, after coating with the highly hermetic, gas-restricting coating 1625, the lites 1601 and 1602 are brought into proximity with one another; separation between the lites being maintained by a plurality of stand-off members 1618. Next, the metal seal members 1622 and 1623 are shaped into the required form (e.g., bellows-shaped) if not already so configured, and moved into contact with one another. Finally, the metal seal members 1622 and 1623 are welded or otherwise hermetically joined to form a junction 1616, thereby creating a hermetic cavity 1610 between the lites 1601 and 1602, as well as within the bounds of the seals. The gas-restricting coatings 1625 are not shown in FIG. 16*f*, but are understood to be present on the areas 1625*a* and 1625*b* indicated in FIG. 16*d* and/or the areas 1625*c* and 1625*d* indicated in FIG. 16*e*.

Figure 17A:
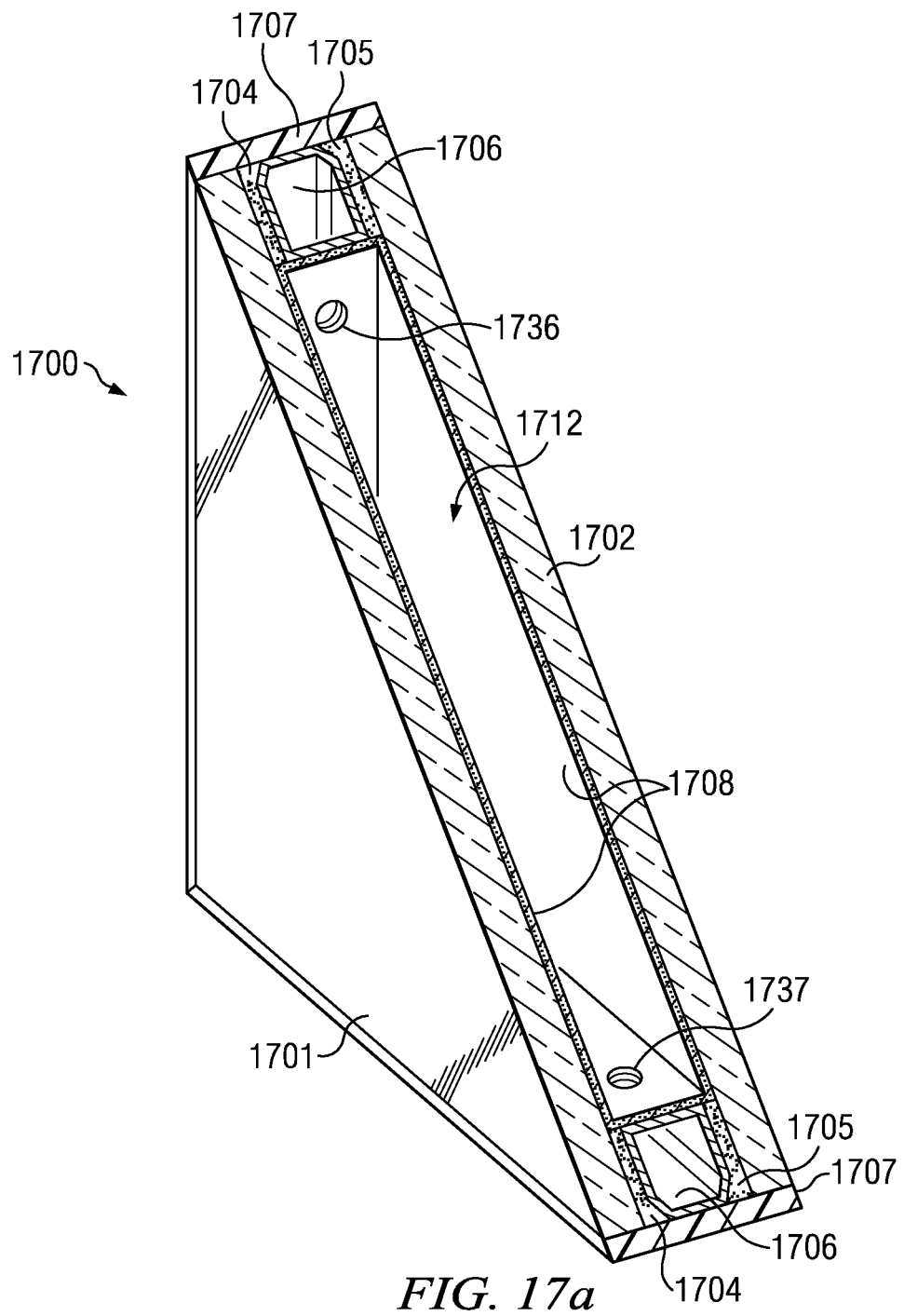
FIGS. 17a and 17b are a perspective cross-sectional view of IGU having a coating applied onto the inside surfaces of the IGU, FIG. 17a being an assembled view and FIG. 17b being an exploded view.

Referring now to FIG. 17*a*, there is shown a perspective cross-sectional view of a multi-pane glass unit in accordance with another embodiment, in this case an IGU. The IGU 1700 is similar to those previously described herein, comprising a first lite 1701, a first adhesive 1704, a spacer 1706, a second adhesive 1705 and a second lite 1702, together defining an interior cavity 1712. A highly hermetic coating material 1708 is disposed onto the inside surfaces (e.g., glass, metal and adhesive) defining cavity 1712 through fill-tubes 1736 and 1737. This coating may be in lieu of coating the exterior perimeter or all exterior surfaces of an assembled IGU with or without a secondary seal. Typically, one or more of the holes 1736 and 1737 shown for the fill tubes would be located at the top side of the spacer unit. In this perspective cut-away view, the holes are shown on a side and bottom location for clarity. Coating the interior surfaces of the cavity 1712 may be an advantage because only the cavity-facing surfaces of the primary adhesives (sealants) 1704 and 1705 are coated rather than their exterior-facing surfaces. Since these sealants will outgas some materials over time, any materials outgassed from the sealants would mostly go into the atmosphere or into and eventually through the secondary sealant 1707 (if provided) instead of into the cavity 1712. If the coating 1708 is highly-hermetic and not just a gas permeation-reducing material, even less undesirable outgassed materials will enter into the cavity 1712.

Figure 17B:
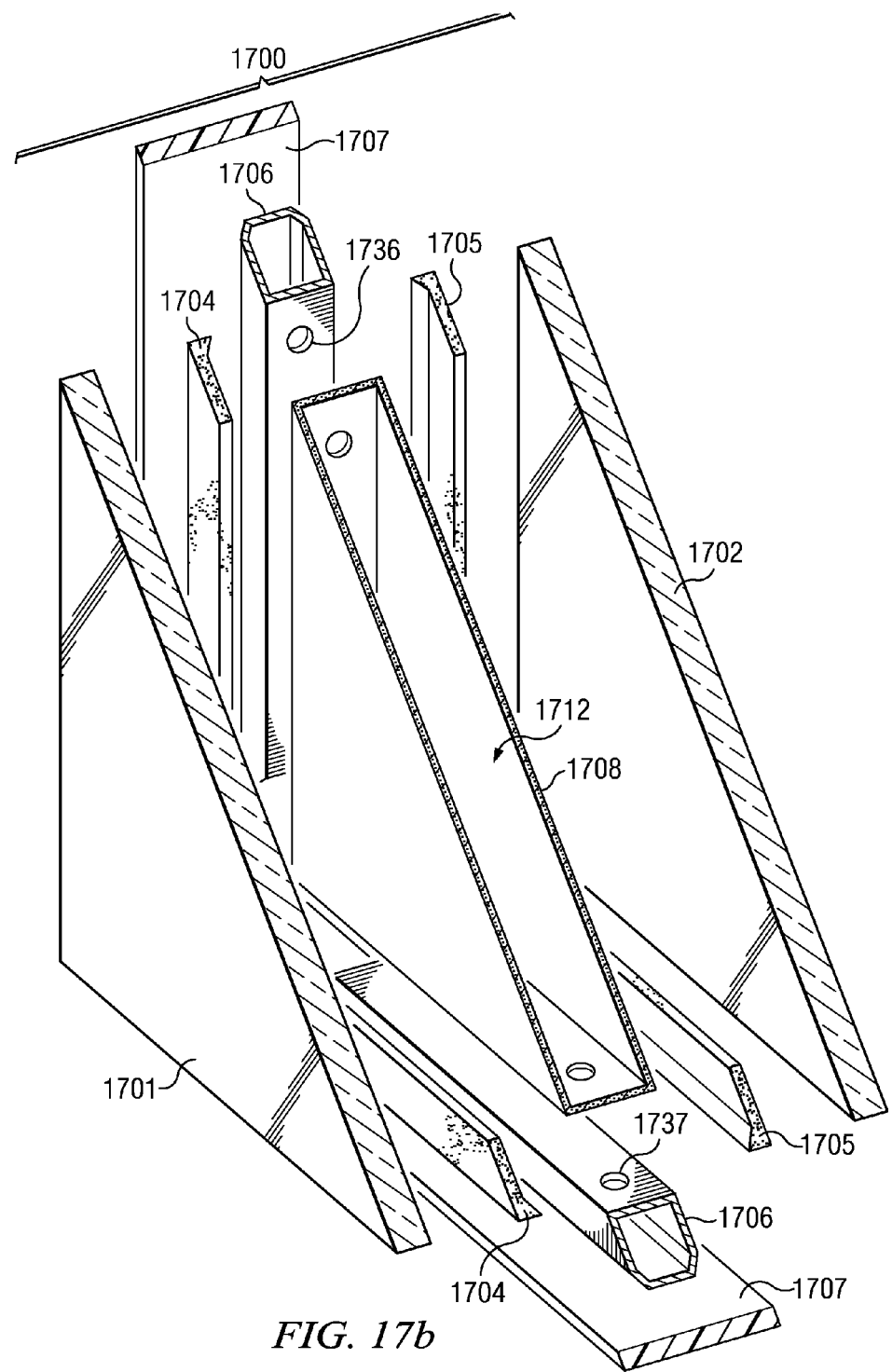

Referring now to FIG. 17b, there is shown an exploded perspective cross-sectional view of the IGU 1700 of FIG. 17a. It will be appreciated that in FIG. 17b the highly hermetic coating 1708 is illustrated in a three-dimensional, free-standing form to show the contours of the coating after application, however, it will be understood that the coating is typically applied in-situ and cannot be removed as shown.

Figure 18A:
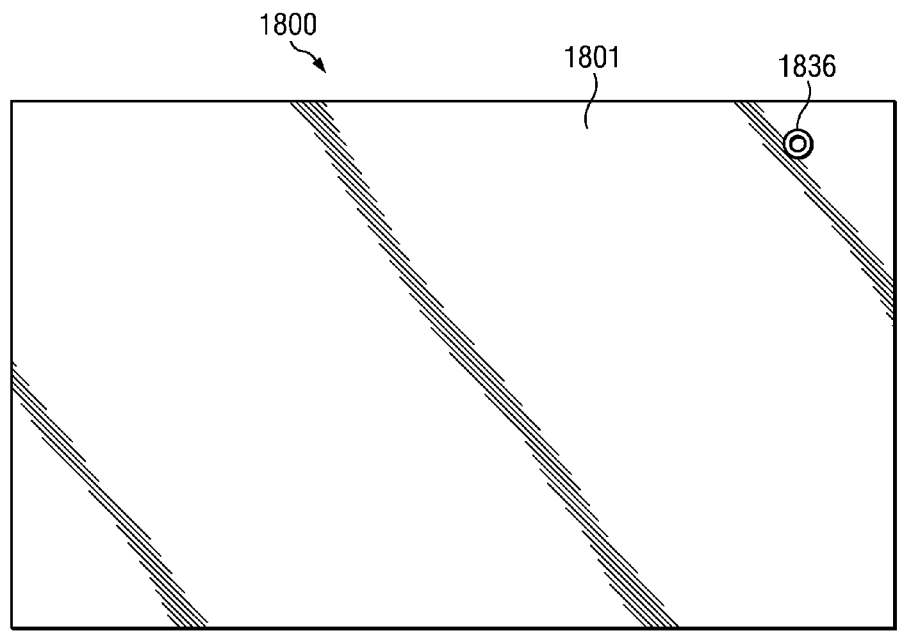
FIGS. 18a and 18b show a VIGU with at least one pump-out tube extending through one of the lites to access the window cavity, FIG. 18a being a top view and FIG. 18b being a cross-sectional side view.
Figure 18B:
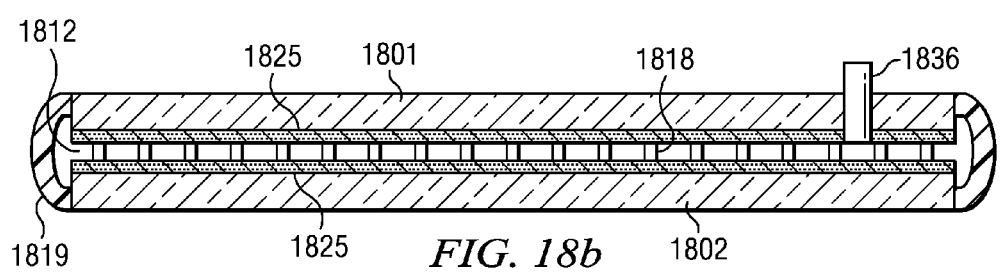

Referring now to FIGS. 18a and 18b, there is shown a VIGU 1800 with at least one pump-out tube 1836. The VIGU 1800 comprises a first lite 1801, a plurality of stand-off members 1818, a second lite 1802, and seal members 1819, these components together defining a sealed interior cavity 1812. The pump-out tube 1836 passes from the exterior of the cavity 1812 into the interior, typically passing through one of the lites 1801 and 1802. In some constructions of a VIGU 1800, the VIGU is assembled and sealed under atmospheric conditions, and the gas in cavity 1812 is evacuated through the tube 1836. In this aspect of the invention, the pump-out tube is used to feed in precursor gases that react on the cavity-facing surfaces to form a highly hermetic coating 1825 (not shown) on the inside surfaces of the cavity 1812. The precursor gases are subsequently evacuated from the cavity 1812 and the tube 1836 is sealed to hold the vacuum.

Figure 19:
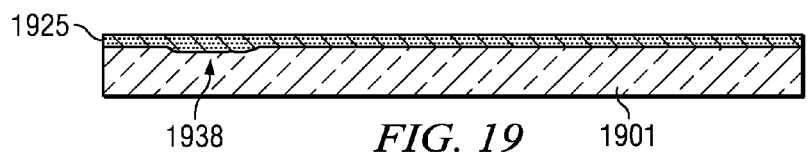
FIG. 19 is a side view of a glass pane with a scratch or microcrack on the surface, where the microcrack is filled using the coating technology.

Referring now to FIG. 19, there is shown a cross sectional view of a glass lite 1901 with a scratch (or microcrack) 1938 on its surface. The coating process is applied to the surface, and the coating 1925 fills the microcrack and mechanically stabilizes it against fracture.

Table 1 provides a list of materials currently believed suitable for use as the gas-restricting coating, also referred to as the highly hermetic coating, described in connection with the aspects and embodiments disclosed herein.

TABLE 1

Potential materials for use as the highly hermetic coating for multi-pane IGUs and VIGUs.

| | |
|---|---|
| Nitrides: | AlN, TaNx, NbN, TiNx, BN, MoN, WxN, ZrN, HfN, GaN, InN |
| Carbides: | TiC, NbC, TaC |
| Elements: | Pt, Ru, Ir, Pd, Rh, Cu, Fe, Mo, Co, Ni, W, Cu, Ag |
| Sulfides: | ZnS, SrS, CaS, PbS |
| Fluorides: | CaF2, SrF2, ZnF2, MgF2, LaF3 |
| Oxides: | Al2O3, TiO2, Ta2O5, Nb2O5, HfO2, ZrO2, SiO2, ZnO, MgO, La2O3, Y2O3, Sc2O3, Er2O3, V2O5, CeO2, SnO |
| Metal Alloys: | InGa, SnAu |

Several different coating processes can be used to prepare a gas-restrictive or highly hermetic seal for an IGU or VIGU, including but not limited to: sol-gel; electroless deposition; chemical vapor deposition; physical vapor deposition; and atomic layer deposition. Examples of each coating method are described below.

The methods of coating of VIGUs are very similar that for coating IGUs, with the difference being largely related to performance: A VIGU must maintain a pressure of less than 1 millitorr ($1 \times 10^{-3}$ torr) over its desired 10-40 year life in order to maintain its low U value. As a result, the VIGU coatings herein are referred to as "highly hermetic". For IGUs, the goal of a gas restrictive coating is to keep the leak rate of argon down to less than 1% of the cavity volume per year, so that no thermally significant change in gas composition will occur over the lifetime of the system; these coatings are referred to as "gas restrictive". For VIGUs, the most significant gas is helium, which is present in the atmosphere at 5 ppm, and has by far the highest diffusion mobility of any atmospheric gas. The leak rate of helium through the bond line produced by the highly hermetic coatings of this invention should ideally be less than $1 \times 10^{-8}$ cc(STP)/sec, and even more preferred to be less than $1 \times 10^{-10}$ cc(STP)/sec (where STP is Standard Temperature and Pressure) for a 1 $m^2$ meter window. Clearly, a "highly hermetic" coating will also function to be "gas restrictive", but the converse is not necessarily true. The two types of coatings may be made of exactly the same material, or by similar processes, or with entirely different materials and processes, as long as the cost and performance specifications for the application are met.

The gas-restrictive coating may be added to the surface of the primary sealant, but before the application of the secondary sealant. This may be accomplished, for example, by applying a sol-gel precursor in water to the surface of the primary sealant, where the sol-gel precursor cures or matures into a dense, thin ceramic film after the evaporation of water. In this application, it may be preferred to oxidize the exterior surface of the primary sealant, in order to improve its wettability. This may be accomplished by, for example, exposing the exterior of the primary sealant to a corona discharge or downstream plasma, in order to oxidize the surface of the sealant. Examples of materials that are deposited using sol-gel techniques include silica and titania. In some embodiments, after the coating process, the window is heated to approximately 60° C. to further cure the sol-gel material.

In another aspect of this invention, application of a coating may be accomplished by electroless deposition of a metal such as copper, nickel, silver, or tin-gold eutectic, to form a microns-thin metal layer on the sealant. For this approach, one can use a commercially available electroless metal solution such as the "Enshield Plus" brand nickel system available from Enthone, Inc. In this solution it is not required that the deposited material be pure; large percentages of impurities (such as those commonly seen in high phosphorous nickel coatings) are explicitly envisioned. Regardless of what solution is used, electroless deposition typically occurs through the steps of: 1) cleaning the substrate to remove oils and debris; 2) activating the substrate through proprietary chemistries, commonly a tin reagent; 3) deposition of a palladium seed layer on the activated surface; and 4) electroless metal deposition atop the seed. Typical electroless processes deposit films from 0.01 μm to 10 μm, thicknesses which are acceptable for this application. In a preferred embodiment, the thickness of the electroless layer is from 0.1 to 10 μm; in a more preferred embodiment, it is from 0.5 to 2 μm.

In another aspect of this invention, the coating is applied by very low temperature chemical vapor deposition, such as that described in U.S. Pat. No. 7,223,676, which is incorporated herein by reference. In one example of such a process, the window is placed into a chamber containing a silicon-containing gas such as silane, and molecular oxygen, and a torroidal plasma is ignited to deposit the vapor phase material onto the window.

In another aspect of this invention, the coating is applied by a physical vapor deposition process such as sputtering. In one example, the glass of the window is masked by an adhesive polymer film, and oriented to expose part of the adhesive bond to the sputter source, and the sputtering process is performed. The window is then rotated to expose a second part of the adhesive bond to the sputter source, and this process is repeated as needed to coat the adhesive seal.

In a preferred embodiment of this invention, a gas-restrictive coating is created by an atomic layer deposition (ALD) process. In ALD, the substrate is exposed sequentially to two precursor compounds, which each attach to the exposed substrate surface. The deposition is repeated over multiple cycles, where each cycle results in growth of the coating by a single atomic layer. A preferred coating material is alumina, which is formed from the two precursors trimethylaluminum and water, where a typical temperature of deposition ranges from 25° C. to 80° C.

ALD is a conformal coating technique, where the precursors coat all exposed surfaces equally, whether or not they are in the line-of-sight. For ideal ALD processes, it is critical to remove the first precursor completely from the gas around the surface before introducing the second precursor. Failure to do so will result in gas-phase reaction between the two precursors, and a "pseudo-CVD" deposition where the uniformity of the coating is not perfect over all parts of the geometry. For this invention, true ALD is not absolutely required, and pseudo-CVD can deliver appropriate coverage as long as the non-uniformities are not too severe. Pseudo-CVD also has the advantage that less time is required to purge the system between precursors. However, for the remainder of this specification, the phrase "ALD" is meant to encompass both true ALD and pseudo-CVD depositions processes unless otherwise noted.

The thickness of an ALD coating on adhesives can be difficult to define for small thicknesses, because the ALD film will nucleate inside the adhesive in the first layers, before forming a coating on top of it. Different adhesives will require different number of cycles before these nuclei coalesce to form a uniform coat. Therefore, to accommodate such differences, all of the thicknesses below represent thicknesses achieved by an equivalent number of deposition cycles on glass, and the thickness of the inorganic coating over an adhesive is expected to be slightly less. Alternatively, the ALD coating can be specified by the number of cycles applied, and in some cases below an estimate of number of cycles needed to produce a given thickness coating is also provided.

An ALD-based gas-restrictive coating is most easily deposited by placing an IGU that has been sealed by an adhesive into an ALD chamber, and depositing alumina to a thickness of about 0.4 nm to 1 μm. A preferred range of thickness is from 1-60 nm for effective barrier properties at minimal cycle time, which corresponds to roughly 12 to 800 cycles of ALD; thinner films will also work for this gas-restrictive layer in some instances. In some embodiments, other elements such as zirconium are added to the alumina in small amounts (0.1-10%) in order to improve the flexibility, durability and toughness of the coating; for example, nanolaminate of alumina and zirconia can be applied, or a small amount of zirconia can be added as an impurity to the alumina film.

In some embodiments, this coating is applied just after the primary adhesive sealant is used for the assembly of the IGU, but before the secondary sealant is applied. In some embodiments, the secondary sealant is applied around the IGU before the ALD process. In further embodiments, a third sealant is applied over the ALD and secondary sealant after the ALD process is complete, in order to protect the ALD coating from scratching and provide balanced coefficient of thermal expansion (CTE) stresses on both sides of the coating.

In some embodiments, the ALD coating is deposited onto the inner surfaces of the IGU, by feeding the chemical starting materials into the IGU cavity through the gas-fill feed tubes. In one approach, the cavity is first purged with such inert gases as nitrogen by passing it through the first feed tube and out the second feed tube. Subsequently, ALD precursor gas is passed into the window cavity through a first feed tube, and exhausted through a second feed tube. Nitrogen gas is similarly applied and exhausted through these feed tubes in between each gas exposure, in order to minimize CVD deposition. To obtain acceptable gas-restrictive properties, the film deposited this way can be as thin as 5-10 nm, in order to minimize the time required for deposition. Thicker films are also conceived, which improve the barrier properties and the ability of the system to maintain acceptable performance over long-term thermal cycling. In one embodiment, the deposited film is alumina or a ceramic that is greater than 50% alumina. ALD process can be carried out in a range of temperatures. In one approach, the ALD process is done at room temperature. In another approach, the ALD process is done at approximately 65° C. In another approach, the ALD process is done at 120° C.

In some embodiments, the ALD is done through a single tube, where application of each precursor gas is followed by application of a vacuum to remove excess gas.

In some embodiments, the ALD film sufficiently thick to change the emissivity of the low-e coating on the inside-facing surface(s) of one or both of the lites. In that case, it is advantageous to design a low-e coating so that its emissivity is improved by the addition of a final ALD coat. Therefore, in some embodiments the emissivity of the interior window coating will be lower after the coating process than it was before the coating process.

In some embodiments, only a single exposure of precursor is required to create a gas-restrictive layer. Because the precursor compounds such as trimethylaluminum diffuse inside the adhesive itself during deposition, subsequent exposure to water (either in the chamber, or in the outside environment) will result in a significant density of alumina nanocrystals being formed within the polymer bulk. If they are of sufficient density, these nanocrystals can be enough to create an acceptable gas-restricting layer without the formation of a true coating on top of the adhesive. Thus, a gas-phase deposition process (whether ALD or CVD) that does not form a contiguous/continuous coating on top of the adhesive is explicitly envisioned here.

For IGUs, the goal of a gas restrictive coating is to keep the leak rate of argon down to 1% of the cavity volume per year, so that no significant change in gas composition will occur over the lifetime of the system.

In one embodiment of the invention, there is a desiccant incorporated inside the IGU, and this desiccant is coated during the coating process. In some examples, the coating over the desiccant is thin enough so as not to interfere with the performance of the desiccant. In other examples, the coating over the desiccant is thick enough to inactivate the desiccant, and the desiccant must be re-activated inside the window. This can be accomplished, for example, by locally heating the desiccant with NIR or visible or UV light, for example using a laser. This heating process vaporizes residual water inside the desiccant (as even a "dry" desiccant contains some water accumulated through various handling processes), which expands and breaks through the coating, thus restoring much of the original activity of the desiccant. Other methods of heating the desiccant include electrical or magnetic induction, if an appropriately susceptible material is included with the desiccant to render such an operation viable.

In some embodiments, it is desirable to deposit an ALD or other film only on the adhesive, and not coat other areas, such as the window itself. In such circumstances, it is preferred to use a "mask" to cover the areas that are not intended to be coated. Thus, in one aspect of this invention the coating is made by a process where: (1) a masking film is placed over the window glass during the coating process, (2) the bonding adhesive is coated using a coating process such as one of the examples listed above, and (2) the film is subsequently peeled off or otherwise removed from the window. Using this approach, the window glass is not coated, but the adhesive bond is.

In another embodiment of the current invention, the multi-pane IGU uses "aerogels" to fill the internal cavity or cavities of the IGU. Aerogels are small beads of trapped gas that in this application are placed between the panes of an IGU to improve its insulating value. Aerogels for use in IGUs have been in development for approximately 15 years and utilized in some translucent skylight applications. When using aerogels, it is challenging to coat the inside of the glass unit after application of the gel, because the diffusion of gas through the gel is so restricted. As a result, when using aerogels, it is preferred to coat the outside of the window to improve the gas impermeability of the units.

As stated above, the methods for coating adhesive in VIGUs are similar to those for coating adhesive in IGUs, with more care given to ensure that a coating meets the required hermeticity specification, namely, that the window maintain a pressure of less than 1 millitorr over its desired 20-40 year life. As a result, the details of the sealing methods will not be recapitulated, and the methods used above may be combined with any approach listed here, unless specifically stated otherwise. A preferred method for coating VIGUs adhesives is atomic layer deposition (ALD) of greater than 50% alumina at approximately 120° C. to a thickness of 20-100 nm.

In the cases described below, the purpose of the coating is to extend the lifetime of the VIGU by decreasing the rate of permeation of gas into the VIGU cavity. In one example, the rate of diffusion of helium into the cavity (inclusive of diffusion through glass, bond, and metal if present) is greater than $1\times10^{-8}$ cc (STP)/sec without the coating, and less than $1\times10^{-9}$ cc (STP)/sec when coated. In another example, the rate of outgassing of hydrogen into the cavity is greater than $1\times10^{-8}$ cc (STP)/sec without the coating, and less than $1\times10^{-8}$ cc (STP)/sec when coated.

The leak rate of gas through the coated adhesive bond will be directly proportional to the thickness of the bond. Thus, it is generally preferred to make the bond as thin as is manufacturable. One preferred thickness of the bond line is 75 μm, though thicknesses of 250 μm or more are acceptable as long as the hermeticity of the coating is sufficient.

In one embodiment, a VIGU may be sealed with an adhesive, and then the entire VIGU coated with a highly hermetic layer by one of the above-mentioned methods. This approach can be used for both conventional double-pane VIGUs or hybrid windows similar to the NSG Spacia 21, a triple pane window with one vacuum cavity and one air- or gas-filled cavity. A preferred method of sealing such an assembly is to prepare the adhesive-sealed VIGU, and then immediately insert the VIGU into a large area ALD tool for coating. A typical coating is 20-100 nm of alumina, coated at 120° C.

Sealing the adhesive inside the cavity creates a requirement that the adhesive itself be non-outgassing and not react with UV light to form volatile organic fragments; if either occurs, the pressure inside the window may rise above 1 millitorr as a result, degrading the window's insulating properties. An example of a material with excellent outgassing properties and good UV resistance is an aerospace grade filled or unfilled silicone, such as Dow-Corning 93-500 or Nusil SCV1-2599. A secondary adhesive may be applied after the hermetic coating to supplement the mechanical strength of the assembly and protect the highly hermetic coating, if desired.

In some embodiments, the long-term performance of windows sealed in this way are improved by the addition of gas and moisture getters such as zeolites; carbon dioxide sorbents such as calcium hydroxide; and reactive metals such as barium, which all act to getter gas if it outgases from the adhesive over time. In some embodiments, the getters are coated during the coating process. In one aspect, the coating is thin enough to not impede the flow of gas into the getter. In another aspect, the coating is sufficiently thick to significantly lower the activity of the getter after the coating process. Thus, in one embodiment, the getter is re-activated by locally heating it to release trapped gas and/or expand the physical area of the getter, and thus crack the coating and restore much of the getter's original activity. In one aspect, this heating process is done using a NIR or visible or UV light laser. In another aspect, the getter is, or is coated onto, a conductive element, and this conductive element is heated using inductive coupling, which firsts heat the conductive element and in turn heats the getter material. In one example, the getter is barium metal, which is coated onto a nickel wire and inserted into the window, and the nickel wire is heated by inductive coupling to approximately 700° C. or higher to vaporize the barium. In another example, the nickel wire is coated with lithium metal, and the wire is heated to approximately 500° C. or higher to vaporize the lithium.

The VIGU may also be prepared by bonding each lite to a metal frame using an adhesive, and then welding the frames together in vacuum to form the final unit. By using this approach, it becomes possible to coat the cavity-facing surface of the adhesive layer prior to welding the frames together, so that outgassing from the adhesive into the vacuum cavity is prevented. This approach thus allows a plurality of adhesives to be used.

An example of adhesive usable by this method is Hysol 9394 two-component epoxy. In one manifestation, the adhesive is mixed with 75 μm glass beads and dispensed around the edge of a lite, and the lite is adhered to a metal frame made from a metal or alloy foil that is chosen to so it's CTE closely matches the CTE of the glass. The lite and frame are then subjected to a coating process such as atomic layer deposition, so that the adhesive bond is effectively coated by a hermetic seal. A preferred method of creating the barrier is to first bond each lite to a metal frame, and then coat each lite individually in a large area ALD tool with 20-100 nm of alumina, coated at approximately 120° C. The two lites are brought together along with a spacer structure, and the metal films/foils are welded in vacuum to hermetically seal them together. Alternatively, instead of welding the lites together in vacuum, the lites are welded into a single assembly in air, and the cavity is subsequently pumped down using a pump-out tube embedded into at least one of the lites.

In some embodiments, the adhesive surface on the outside surface of the lite is masked with tape, to prevent it from being coated. This is done in order to prevent pressure buildup inside the hermetically sealed adhesive that might lead to rupture of the coating. In some embodiments, a fillet of adhesive exposed on the outer surface of the lite, but not masking it. This fillet will receive a hermetically sealed coating by the aforementioned processes, but because of its greater thickness and more extreme geometry, the coating will be very prone to fracture during thermal cycling, again preventing pressure build-up in the adhesive. In some embodiments, a fillet of adhesive is left exposed on the outer surface of the lite, and this fillet is physically abraded after the coating process to remove some or all of the highly hermetic coating, achieving the same result.

In some embodiments, the inner pane of glass is masked with tape so that the glass is not coated. This maintains the surface properties of the window from previous processing, so that, for example, a low-e coating and/or a scratch-resistant coating are not changed by the barrier application process. In some embodiments, the inner pane is not masked, and the previous coating systems are designed so that the coating performance is improved after deposition of the barrier material.

In some embodiments, the VIGU is sealed with adhesive, leaving one or two inlets to allow fluid communication with the cavity. The coating process is then performed on the inside cavity of the VIGU, through the inlet(s), in a process described above for an IGU. A preferred coating process is to deposit 20-100 nm of alumina by ALD at 120° C., where the process gases are introduced into and expelled from the VIGU cavity through the inlets. In this approach, there is no need for a conventional ALD chamber, as the cavity itself serves as the "chamber" for the reaction.

The present invention disclosed and claimed herein comprises, in another aspect thereof, a method for manufacturing a VIGU which uses a thin metal seal attached to lites one and two to create the hermetic seal at the VIGU's perimeter. One or more of the current state of the art highly-hermetic glass-to-metal bonding methods, including ultrasonic bonding, diffusion or thermal-compression bonding, chemical bonding with or without mechanical assistance and glass-frit bonding are used to bond the glass the metal. After the metal members are joined together to create a sealed VIGU, the glass to metal bond is coated on its external surfaces with a highly hermetic material layer. Defects and/or damage (e.g. cracking) can occur to the glass-metal seal during the manufacturing process or subsequently which do not mechanically separate the metal to glass seals or seal area, but allow gas permeation through the seal. The highly hermetic coating bridges and strengthens the defects and/or damage, prevents permeation into the evacuated cavity of any gases, and inhibits further crack growth. A preferred process for this aspect involves inserting the entire VIGU into a large-area ALD chamber and depositing alumina (from trimethylaluminum and water) over the outside of the window at approximately 80° C., to a thickness of 20-100 nm. The window glass itself may be optionally masked to avoid coating with alumina. In another embodiment, the window glass is not masked, and is subsequently coated with another material in order to improve the transmissivity of the glass. The specific choice of material for this coating, as well as its thickness, depends on the thickness of alumina used. In one embodiment, this process is used to fill and repair defects in a glass frit-bonded VIGU made using conventional VIGU processing, where a thick glass frit is used to join the two lites and provide a hermetic seal to the cavity, and no organic adhesive is used.

In another embodiment, the glass pane is coated prior to assembly using a process such as atomic layer deposition (ALD), in order to reduce the diffusion rate of gas through the glass. In this process, a coating of approximately 10-100 nm is applied to the glass using ALD, in order to restrict the diffusion of helium, which can have a significant permeability through some glass formulations. In some embodiments of the invention, this ALD coating is greater than 50% alumina. In some embodiments of this invention, this coating drops the permeability of the glass to helium by an order of magnitude. Leak rate for a piece of glass is most easily expressed in the units of cc (STP)*thickness (cm)/(s*area (cm$^2$)), which reduces down to cm$^2$/s, assuming a 1 atmosphere pressure drop between the outside and inside of the cavity. Thus, in this example, the leak rate is taken from greater than $10^{-11}$ cm$^2$/s to less than $10^{-12}$ cm$^2$/s for a 2 ft.×3 ft. window. This increases the time at which the window can maintain a vacuum of less than 1 mtorr from just a few years, to the greater than 10 year period needed for commercial applications.

In another embodiment, the gas permeability of the glass for the VIGU is reduced by exposing it to a vapor containing a large alkali atom such as cesium. This may be particularly useful in applications where a borosilicate glass or fused silica is used instead of conventional soda lime glass because, for example, the CTEs of these glasses are lower than that of soda lime glass. These lower CTEs will result in less mechanical stress on the edge seal when one side of the VIGU is heated or cooled relative to the other, since the total thermal expansion/contraction of the heated/cooled side will be less. However, borosilicate glasses possess an inherent permeability to helium that is approximately two orders higher than that for float glass at room temperature. A VIGU made from a glass such as a borosilicate (e.g., Pyrex 7740), a fused silica, or some compositions of soda lime glass may lack the required low permeability necessary to prevent helium from diffusing into the vacuum cavity over the VIGU's 10-40 year life, and therefore will require a coating in order to show good long term reliability. In one example, cesium nitrate salt is disposed on or near the glass, and the glass is heated to greater than 400° C., above the decomposition temperature of the cesium salt. At this temperature, cesium vapor penetrates into a small depth into the glass, and occupies interstitial spaces between silicon and oxygen atoms. By blocking the interstitial spaces, the permeability of helium through the glass is greatly reduced.

In one aspect of this invention, the process of coating the glass improves its tolerance of compressive and tensile stresses, so that it is less likely to fracture when assembled into a VIGU. In a VIGU, the two lites are separated by an array of stand-off elements, especially metal stand-offs, which are approximately 0.2 to 1 mm each in diameter, and which bear the load of atmospheric pressure pushing in from the outside of the lites. These metals stand-offs are pressed into the glass with a large compressive force. If there is a small number of scratches or other surface defects on the glass, and at least one of these defects spatially overlaps with the stress fields created around the stand-offs, then there is a significant likelihood that the defect will propagate into a crack, which will eventually fracture the window during its life. By coating the window with a conformal film by a process such as ALD, it is possible to fill these defects and render them less likely to propagate into a crack. Thus, in one aspect of this invention, the resistance of the glass to fracture is improved. Because this resistance depends on the defect density on the original glass, the improvement is best expressed as a statistical improvement in the likelihood of a piece of glass to fracture under a given compressive load from a stand-off, where the critical load depends, in part, on the geometry of the stand-off. This improvement can be measured at the 2-sigma level, 3-sigma level, 4-sigma level, 5-sigma level, or 6-sigma level, for example. Because there are on the order of 1000 stand-offs per square meter of glass, it is important to have a very low critical defect level overall to make a successful commercial VIGU.

In another embodiment, a metal member is coated by a process such as ALD to reduce the diffusion of hydrogen out of the metal. This metal member is then bonded to the glass using any of the aforementioned processes to form a lite, and the two lites are welded together to form a complete VIGU. One advantage of ALD is that the thickness of the deposited film is very low, and so the welding process is not inhibited by the coating. Although the welding process described here may expose a new, uncoated area of metal to the vacuum cavity, the total area of uncoated metal is greatly reduced, and thus the total rate of diffusion of hydrogen into the cavity can be reduced sufficiently to assure the VIGU of its necessary commercial life. In one example, the leak rate of hydrogen into the window cavity is dropped by an order of magnitude, for instance from greater than $10^{-8}$ cc (STP)/s to less than $10^{-9}$ cc (STP)/s.

In another embodiment, the glass is bonded to a metal member using any of the above processes, and the glass and the metal are subsequently coated by a process such as ALD to restrict the rate of diffusion of gas into the chamber. Such a process will reduce the diffusion into the VIGU cavity of helium through the gas, and hydrogen from the metal.

In some embodiments, a barrier coating is applied over at least one glass surface of the VIGU, and this barrier also reduces the coefficient of friction of the glass. In a preferred embodiment, the coefficient of friction of the coating material versus stainless steel is 0.3 or lower. In one embodiment, the coating is boron nitride, as applied by atomic layer deposition. This low coefficient of friction is especially desirable in VIGU configurations where one lite moves relative to the other, for example because of a difference in temperature between the two lites.

In some embodiments, the coating is transparent to visible light. While this is not necessary if only metal or the bond line is coated, such transparency is useful when the window is coated. In a preferred embodiment, the transmissivity of the coated glass is greater than 85%, relative to uncoated glass. In a more preferred embodiment, the transmissivity of the coated glass is greater than 90% relative to uncoated glass. In some embodiments, this coating is aluminum oxide at a thickness of 20 nm.

In some embodiments, the coating process contains more than one layer. This may be valuable, for example, to improve the resistance of the film to cycling mechanical stresses. In one aspect, this is accomplished by preparing a nano-laminate film using atomic layer deposition; for example, a nanolaminate of alumina and zirconia. In another aspect, the coating process uses a first film to provide a good gas barrier, and a second film on top of it to provide enhanced tribological properties. For example, the first film is 20 nm of alumina as deposited through an ALD process, and the second film is 50 nm of diamond-like carbon (DLC). In this case, the diamond-like carbon may not be sufficiently uniform to serve as a highly hermetic layer on its own, but is sufficiently thick to provide a low coefficient of friction.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An insulated glass unit (IGU), comprising:
a first pane of a transparent material;
a second pane of a transparent material, the second pane being spaced apart from the first pane to define a cavity therebetween, wherein each of the first and second panes has a respective cavity-facing surface that faces toward the cavity;
an inert fill-gas disposed within the cavity;
a spacer member bonded to the first pane with a first adhesive layer disposed between portions of the spacer member and the first pane, the first adhesive layer forming a first portion of a first gas-tight connection between the first pane and the spacer member and having a cavity-facing surface facing the cavity; and
a gas-restrictive coating disposed continuously over both the entire cavity-facing surface of the first adhesive layer and the entire cavity-facing surface of the first pane and forming a second portion of the first gas-tight connection, where the gas-restrictive coating is an inorganic layer having a leak rate of the fill-gas from the cavity through the gas-restrictive coating of less than 1% of the cavity volume per year.

2. An IGU in accordance with claim 1, wherein the fill-gas is at least one of argon, krypton, xenon or sulfur hexaflouride.

3. An IGU in accordance with claim 1, wherein the second pane is bonded to the spacer member with a second adhesive layer, the second adhesive layer forming a first portion of a second gas-tight connection between the second pane and the spacer member and having a cavity-facing surface that faces toward the cavity.

4. An IGU in accordance with claim 3, further comprising a gas-restrictive coating disposed over both the entire cavity-facing surface of the second adhesive layer and the entire cavity-facing surface of the second pane and forming a second portion of the second gas-tight connection between the second pane and the spacer member, where the gas-restrictive coating is an inorganic layer having a leak rate of the fill gas from the cavity through the gas-restrictive coating of less than 1% of the cavity volume per year.

5. An IGU in accordance with claim 1:
wherein the second pane is bonded to the spacer member with a second adhesive layer, the second adhesive layer forming a first portion of a second gas-tight connection between the second pane and the spacer member and having a cavity-facing surface facing the cavity;
wherein the spacer member has a cavity-facing surface that faces toward the cavity; and
wherein the gas-restrictive coating is further disposed continuously over the cavity-facing surface of the spacer member, the cavity-facing surface of the second adhesive layer and the entire cavity-facing surface of the second pane.

6. An insulated glass unit (IGU), comprising:
a first pane of a transparent material;
a second pane of a transparent material, the second pane being spaced apart from the first pane to define a cavity therebetween;
a fill-gas disposed in the cavity between the first and second panes, the fill-gas being at least one of argon, krypton, xenon or sulfur hexaflouride;
a first adhesive layer of a non-gas-restrictive bonding material disposed around the periphery of the cavity between portions of the first and second panes and forming a first portion of a structural connection between the first and the second panes;
each of the first and second panes and the first adhesive layer having respective cavity-facing surfaces that face toward the cavity; and
a gas-restrictive coating layer of an inorganic material coating continuously over at least the entire cavity-facing surface of the first adhesive layer and the entire respective cavity-facing surface of at least one of the first and second panes, where the gas-restrictive coating is an inorganic layer having a leak rate of the fill-gas from the cavity through the gas-restrictive coating of less than 1% of the cavity volume per year.

7. An IGU in accordance with claim 6, wherein the structural connection between the first and second panes further comprises:
a first frame disposed around the periphery of the cavity and having a first portion attached to the first pane by the first adhesive layer and a second portion;
a second adhesive layer of a non-gas-restrictive bonding material, the second adhesive layer being attached around the periphery of the cavity between the second portion of the first frame and the second pane and having a cavity-facing surface facing the cavity; and
wherein the gas-restrictive coating layer further extends continuously over the entire cavity-facing surface of the second adhesive layer and the entire cavity-facing surface of the other of the first and second panes.

8. An IGU in accordance with claim 7, wherein the first and second adhesive layers and overlying gas-restrictive coating layer have a leak rate of the fill-gas from the cavity through the adhesive layers and gas-restrictive coating layer of less than 1% of the cavity volume per year.

9. An IGU according to claim 6, wherein the inorganic material of the gas-restrictive coating layer comprises at least 90% alumina.

10. An IGU according to claim 6, wherein the gas-restrictive coating layer has a thickness from 0.4 nm to 1 μm.

11. An IGU according to claim 6, wherein the first and second adhesive layers each have respective outside-facing surfaces that face away from the cavity, and a second gas-restrictive coating layer coats the outside-facing surface of at least one of the first and second adhesive layers.

12. A method for manufacturing an insulated glass unit (IGU), the method comprising the following steps:

providing a first pane of a transparent material having a cavity-facing surface defined thereon;
affixing a first adhesive layer of a non-gas-restrictive bonding material around the periphery of the cavity-facing surface of the first pane, the first adhesive layer defining a respective cavity-facing surface;
jointly coating the respective entire cavity-facing surface of the first pane and the entire cavity-facing surface of the first adhesive layer with a first continuous gas-restrictive coating layer of an inorganic material;
providing a second pane of a transparent material having a respective cavity-facing surface defined thereon, the second pane being spaced apart from the first pane to define a cavity therebetween;
operatively connecting the first pane, the first continuous gas-restrictive coating layer and the second pane to one another to form a gas-restrictive seal around the cavity;
providing an inert fill-gas in the cavity between the first and second panes; and
wherein the gas-restrictive coating is an inorganic layer having a leak rate of the inert fill-gas from the cavity through the gas-restrictive coating of less than 1% of the cavity volume per year.

13. A method in accordance with claim 12, further comprising the following steps:
affixing a second adhesive layer of a non-gas-restrictive bonding material around the periphery of the cavity-facing surface of the second pane, the second adhesive layer defining a respective cavity-facing surface;
jointly coating the respective entire cavity-facing surface of the second pane and the entire cavity-facing surface of the second adhesive layer with a second continuous gas-restrictive coating layer of an inorganic material.

14. A method in accordance with claim 13, wherein the step of jointly coating the respective cavity-facing surfaces of the first pane and the first adhesive layer with a first continuous gas-restrictive coating layer and the step of jointly coating the respective cavity-facing surfaces of the second pane and the second adhesive layer with a second continuous gas-restrictive coating layer are both performed simultaneously.

15. A method in accordance with claim 12, wherein the step of jointly coating the respective cavity-facing surfaces of the first pane and the first adhesive layer with the first continuous gas-restrictive coating layer is performed by chemical deposition.

16. A method in accordance with claim 12, wherein the step of jointly coating the respective cavity-facing surfaces of the first pane and the first adhesive layer with the first continuous gas-restrictive coating layer is performed by physical vapor deposition.

17. A method in accordance with claim 12, wherein the step of jointly coating the respective cavity-facing surfaces of the first pane and the first adhesive layer with the first continuous gas-restrictive coating layer is performed by atomic layer deposition (ALD).

* * * * *